(12) United States Patent
Kim

(10) Patent No.: US 6,937,876 B1
(45) Date of Patent: Aug. 30, 2005

(54) APPARATUS AND METHOD FOR OPENING A COVER OF A MOBILE PHONE

(75) Inventor: Ki-Young Kim, Kyongsangbuk-do (KR)

(73) Assignee: Phoenix Korea Co., Ltd., Hwasung-si (KR)

( * ) Notice: Subject to any disclaimer, the term of this patent is extended or adjusted under 35 U.S.C. 154(b) by 413 days.

(21) Appl. No.: 10/048,477

(22) PCT Filed: Jul. 26, 2002

(86) PCT No.: PCT/KR00/00803

§ 371 (c)(1),
(2), (4) Date: Jul. 2, 2002

(87) PCT Pub. No.: WO01/13529

PCT Pub. Date: Feb. 22, 2001

(30) Foreign Application Priority Data

| Aug. 12, 1999 | (KR) | 1999/33030 |
| Nov. 18, 1999 | (KR) | 1999/51204 |
| Mar. 21, 2000 | (KR) | 2000/14195 |
| Apr. 21, 2000 | (KR) | 2000/21143 |

(51) Int. Cl.[7] .......................................... H04M 1/00
(52) U.S. Cl. ...................... 455/550.1; 455/575.1; 455/575.3; 379/433.01; 379/433.13
(58) Field of Search ................................. 375/433.13

(56) References Cited

U.S. PATENT DOCUMENTS 6,195,431 B1 * 2/2001 Middleton ............. 379/433.13

* cited by examiner

Primary Examiner—Erika A. Gary
Assistant Examiner—Wayne Cai
(74) Attorney, Agent, or Firm—Mayer, Brown, Rowe & Maw LLP

(57) ABSTRACT

Disclosed is an apparatus and a method for opening a cover of a mobile phone, by which the cover of the mobile phone is easily opened, thereby providing convenience for the users of the mobile phone. The apparatus has an operation assembly 150 directly inserted in a pivoting section 4 of a cover 2 of a mobile phone 100, and a button 5 disposed at a predetermined portion of a phone body 1. The operation assembly 150 may be contained in a housing 13, which is inserted in the pivoting section 4. When a user pushes the button 5, the operation assembly 150 releases a compression force and a torsion force applied to a torsion-compression spring. Then, the force of restitution of the spring generates a pivotal movement of the cover 2 by a torsional operation, thereby opening the cover 2.

23 Claims, 25 Drawing Sheets

[a]

[b]

[c]

[d]

[e]

[a]

[b]

[c]

[d]

[a]

[b]

[a]  [b]

[a]

[b]

[a]

[b]

[c]

[a]

[b]

[c]

[a]

[b]

APPARATUS AND METHOD FOR OPENING A COVER OF A MOBILE PHONE

This is a nationalization of PCT/KR00/00803 filed Jul. 26, 2000 and published in English.

TECHNICAL FIELD

The present invention relates to an apparatus and a method for opening a cover of a mobile phone, by which the cover of the mobile phone can be easily opened simply by pressing a button without complicatedly handling the cover.

BACKGROUND ART

In recent times, a mobile phone is a popular, nearly indispensable, appliance, which has various kinds and shapes, such as a bar type in which buttons are exposed to the outside with no cover, a flip type which has a relatively slim cover attached on a phone body to protect the buttons, and a folder type which has a body and a cover which are nearly of the same size and folded to each other.

The mobile phone is widely circulated in the market, so a great number of people use the mobile phone due to its intrinsic characteristic.

When the flip type or folder type mobile phone as described above is used, in general, the phone is used in communication in a state that the cover is opened, while the cover is closed when the phone is not used in communication or is waiting for a call, or in the like cases.

Therefore, especially when the mobile phone rings in the course of being kept in a bag or a pocket, or the like, the user has to hurry up to take out and open the cover of the phone in order not to miss the call.

Especially, in the case of the folder type mobile phone, since the assembling force between the phone body and the cover is considerably large; it is difficult for the user to open the cover with one hand, and therefore the user has to use both hands in opening the cover.

This problem provides considerable inconvenience for the user of the mobile phone, and there has been a request to overcome the problem.

DISCLOSURE OF THE INVENTION

Accordingly, the present invention has been made in an effort to solve the problems occurring in the related art, and it is an object of the present invention to provide an apparatus and a method for opening a cover of a mobile phone, by which the cover of the mobile phone can be easily opened, simply by pressing a button without complicatedly handling the cover.

Generally, a mobile phone comprises a phone body containing a circuit board and having operation buttons, and a cover hingedly assembled with the phone body by means of a shaft connection section of the phone body and a pivoting section of the cover, so that the cover can be pivotally opened and closed.

The apparatus for opening a cover of a mobile phone according to the present invention is so constructed that a housing containing an operation assembly which comprises a torsion-compression spring having spring arms formed at both ends so as to generate an axial force and a torsion force in a rotational direction, an actuator, a clutch and a connection shaft, is disposed within the pivoting section of the cover, or that the operation assembly is directly installed within the pivoting section and a button is disposed at a predetermined position in one side of the phone body and connected to the operation assembly so as to control the operation assembly.

In the apparatus, the linear movement by operation of the button releases both the force of restitution by compression and the force of restitution by torsion retained within the operation assembly, so as to make the cover be rotated by torsional operation, thereby opening the cover.

Especially the apparatus of the present invention further contains means for preventing stress from being accumulated on the torsion-compression spring so as to guarantee the permanent life span of the torsion-compression spring and smooth operation and for strengthening the closed state of the cover so as to prevent the cover from being easily opened by an external impact.

Accordingly, the object of the present invention is to provide an apparatus and a method for opening a cover of a mobile phone, in which a button for opening a cover is provided at a predetermined position of a phone body, at which a user can easily operate the button, so that the cover can be easily opened when the mobile phone is used.

BEST MODE FOR CARRYING OUT THE INVENTION

Figure 1:
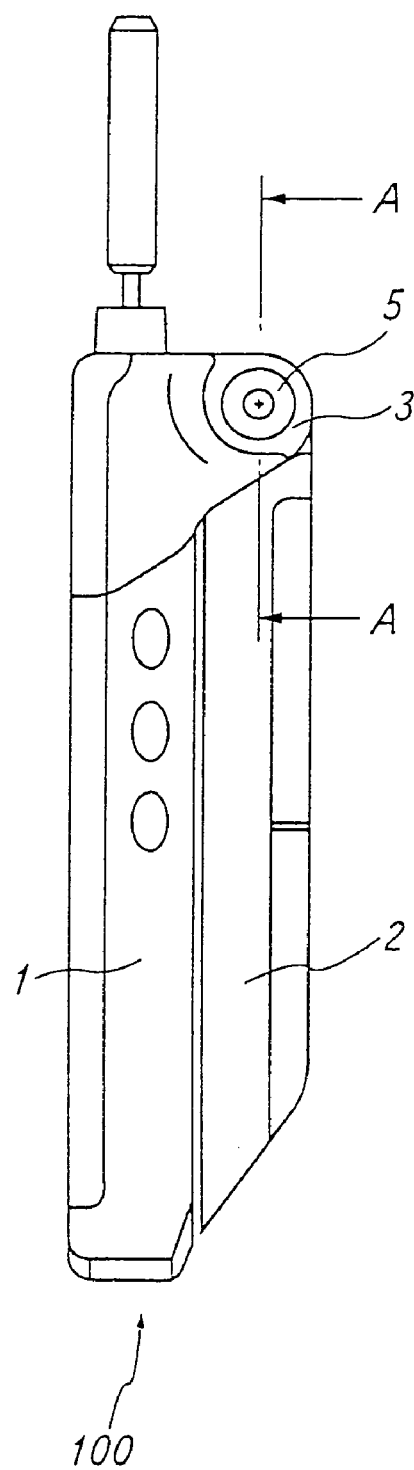
FIG. 1 is a side view of a mobile phone according to the first embodiment of the present invention.
Figure 2:
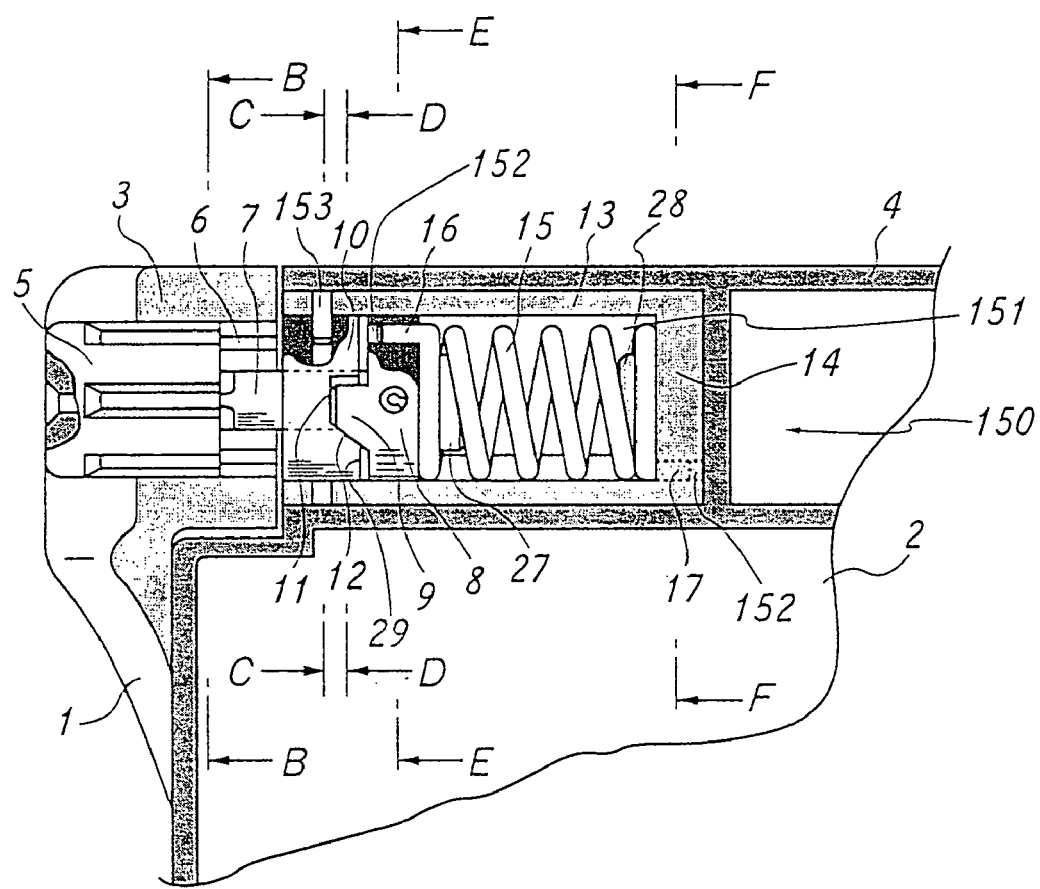
FIG. 2 is a cross-sectional view taken about line A—A of FIG. 1.
Figure 3:
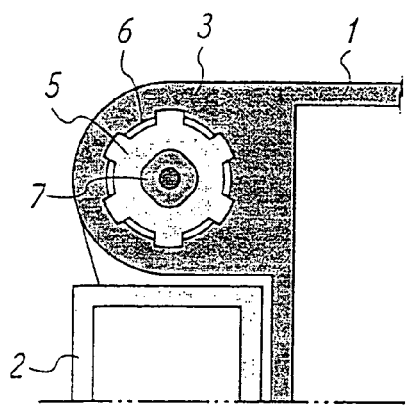
FIGS. 3(a) 3(b), 3(c), 3(d) and 3(e) are cross-sectional views taken about lines B—B, C—C, D—D, E—E and F—F, respectively, of FIG. 2.
Figure 3:
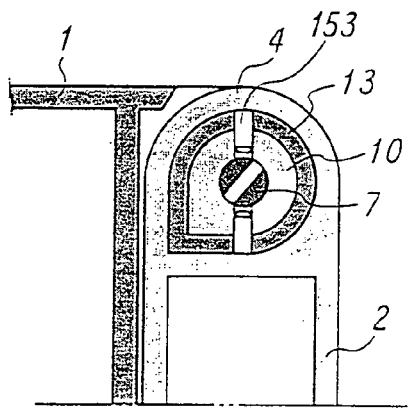
Figure 3:
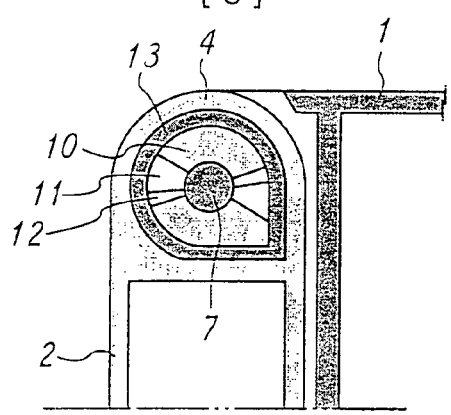
Figure 3:
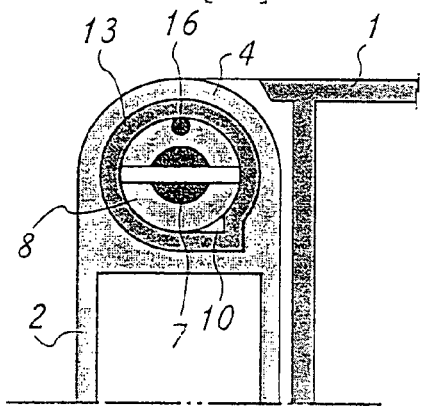
Figure 3:
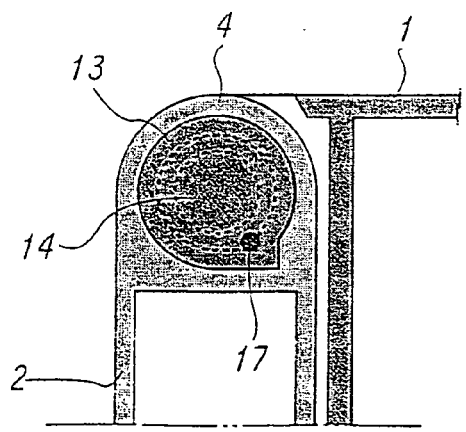
Figure 4:
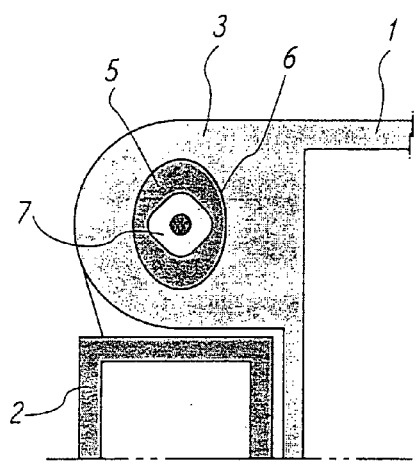
FIGS. 4(a), 4(b), 4(c) and 4(d) are cross-sectional views, taken about line B—B of FIG. 2, showing other embodiments of a button.
Figure 4:
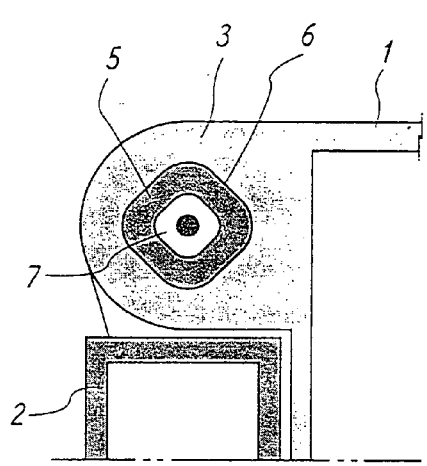
Figure 4:
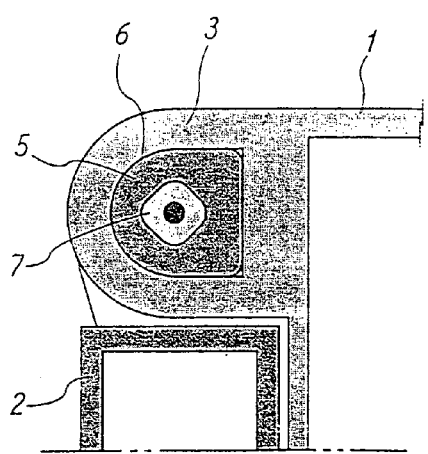
Figure 4:
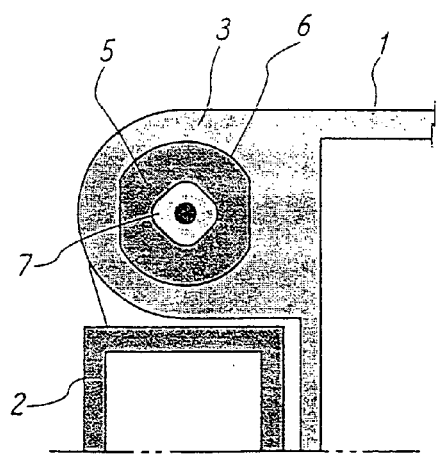
Figure 5:
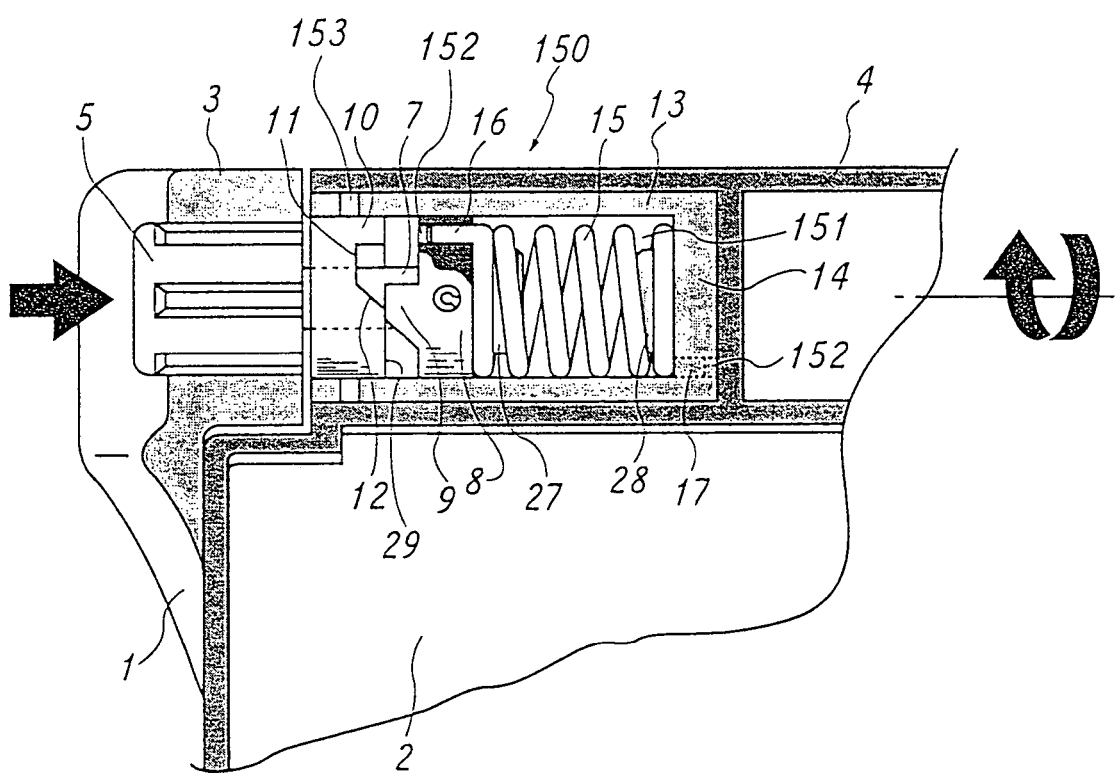
FIG. 5 is a cross-sectional view showing the operation of the embodiment of the present invention shown in FIG. 2.

A mobile phone 100 comprises a phone body 1 containing a circuit board and having operation buttons, and a cover 2 hingedly assembled with the phone body 1 by means of a shaft connection section 3 and a pivoting section 4 of the cover 2, so that the cover 2 can be pivotally opened and closed.

The apparatus for opening a cover of a mobile phone according to the present invention is so constructed that a housing 13 containing operation assembly 150 is disposed within the pivoting section 4 of the cover 2 or that operation assembly 150 is directly installed within the pivoting section 4 and a button 5 is disposed at a predetermined position in one side of the phone body 1 and connected to the operation assembly 150 so as to control the operation assembly 150, and that the linear movement by operation of said button 5 releases both the force of restitution by compression and the force of restitution by torsion retained within the operation assembly 150, so as to make the cover 2 be rotated by torsional operation, thereby opening the cover 2.

Referring to FIGS. 1, 2 and 3(a)-(e), a housing 13 to be inserted so as not to be rotated in a pivoting section 4, and an operation assembly 150 disposed within the housing 13 are described as follows.

A receiving chamber 151 formed in the housing 13 receives a torsion-compression spring 15 having spring arms 16, 17 formed at both ends so as to generate an axial force and a torsion force in a rotational direction, an actuator 8 located in front of the torsion-compression spring 15, and a clutch 10 joined with the actuator 8 in front of the actuator 8.

The spring arms 16, 17 formed at both ends of the torsion-compression spring 15 are inserted into engagement means 152 such as a hole or a recess formed on the inner wall 14 of the housing 13 and in the actuator 8 so that the torsion-compression spring 15 can be twisted, thereby having a maximum torsion torque at a closed position of the cover 2.

Protuberances 27, 28 are formed in a protruded state in the actuator 8 and on the inner wall 14 of the housing 13, so that both ends of the torsion-compression spring 15 are maintained in a stable state and that the torsional efficiency of the torsion-compression spring 15 is maximized when the cover 2 is rotated.

The clutch 10 is fixed to the front side of the housing 13, by means of a fixing means 153 such as a pin or a screw, with the torsion-compression spring 15 compressed, and the actuator 8 fixing one end of the torsion-compression spring 15 is joined to and regulated by the clutch 10.

The clutch 10 has an opening/closing inclination surface 12, a joining recess 11 which a joining protuberance 9 comes in and out from, and a torsion surface 29, and the actuator 8 has a joining protuberance 9 which is engaged with the opening/closing inclination surface 12 of the clutch 10 when the cover 2 remains closed.

The opening/closing inclination surface 12, designed to be engaged with the joining protuberance 9 when the cover 2 remains closed, has an angle of inclination so as to have a force or restitution by the compression of the torsion-compression spring 15 greater than a force of restitution by the torsion of the torsion-compression spring 15, so that the cover 2 is maintained closed.

The torsion surface 29 of the clutch 10 is formed in such a manner that, when the cover 2 is rotated toward the closed position, the torsion surface 29 acts with the joining protuberance 9 to increase only the torsion force of the torsion-compression spring 15.

When the cover 2 is rotated from the closed position to the open position, the force of restitution by the torsion in the rotational direction retained in the closed position enables the cover 2 to be opened.

The actuator 8 may be joined with a connection shaft 7 extending through the center of the clutch 10 by means of a fixing means, or may be formed with the connection shaft 7 in an integrated state.

The button 5, which is inserted into a button hole 6 formed in the shaft connection section 3 in such a manner that the button 5 cannot rotate in the buttonhole 6, is joined with the connection shaft 7, so that the actuator 8 can be released from the clutch 10 by the button 5 so as to rotate the housing 13 by means of the force of restitution by the torsion, thereby opening the cover 2 joined with the housing 13.

It is preferred that a spline is formed at the button 5 and the button hole 6, so that the connection shaft 7 can move only linearly in the axial direction.

FIGS. 4(a)-(d) show other embodiments of the button 5 and the button hole 6, which may be in one of various shapes such as an oval shape, a rectangular shape, and circular shapes with two or three flat surfaces. The button 5 and the button hole 6 of the present invention may employ any of the shapes that does not enable the button 5 to be rotated but allows the linear motion in the axial direction of the connection shaft 7 and the actuator 8. Further, the button 5 or the button hole 6 may have a stopper for preventing the button 5 from excessively coming into the button hole 6 when the button 5 is pressed.

Figure 6:
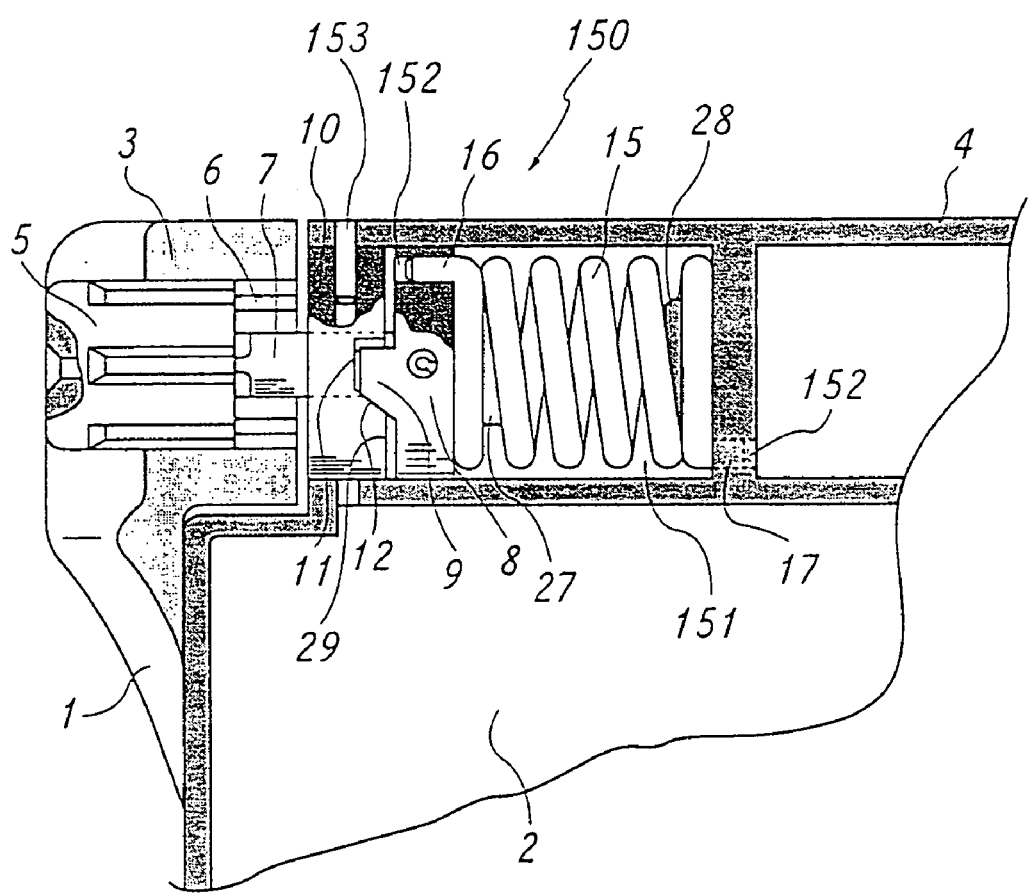
FIG. 6 is across-sectional view according to the embodiment of the present invention in which a housing is replaced by a pivoting section of the cover.
Figure 7:
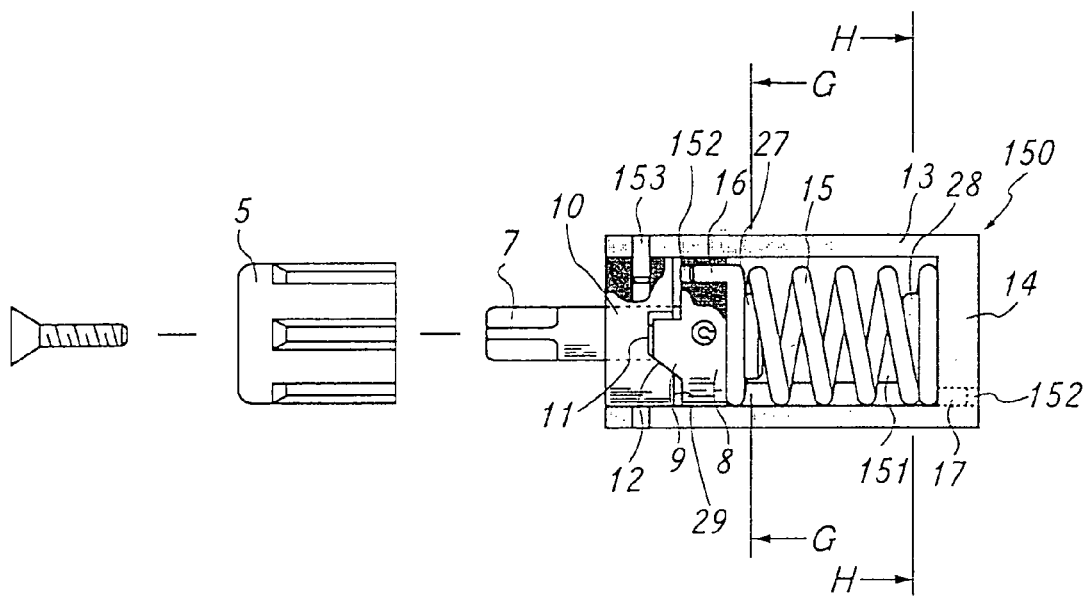
FIG. 7 is a cross-sectional view of the housing shown in FIG. 2.

FIG. 6 shows the operation assembly 150 which is directly installed within the pivoting section 4 of the cover 2 without being contained in the housing 13.

FIGS. 8(a)–8(b) and FIGS. 9(a)–9(b) show the engagement means 152 for fixing the spring arms 16, 17 of the torsion-compression spring 15.

Figure 8:
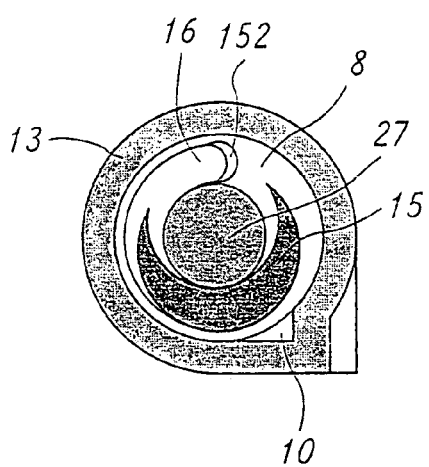
FIG. 8(a) is a cross-sectional view of engagement means, taken about line G—G of FIG. 7.
FIG. 8(b) is across-sectional view showing another embodiment of engagement means, taken about line G—G of FIG. 7.
Figure 8:
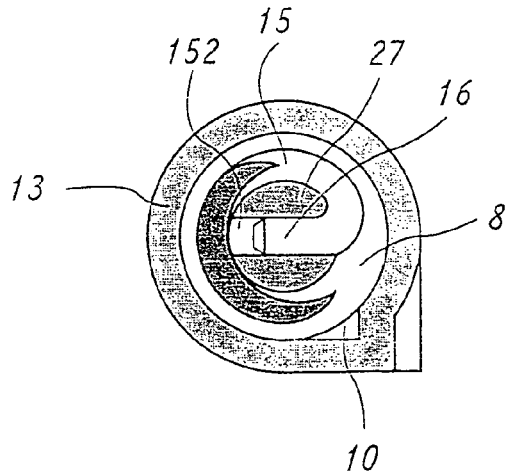

FIG. 8(a) shows that a recess or a hole for the spring arm 16 is formed in the actuator 8, while FIG. 8(b) snows that a recess or a slot for the spring arm 16 is formed at the protuberance 27 which is formed with the actuator 8 in an integrated state.

Figure 9:
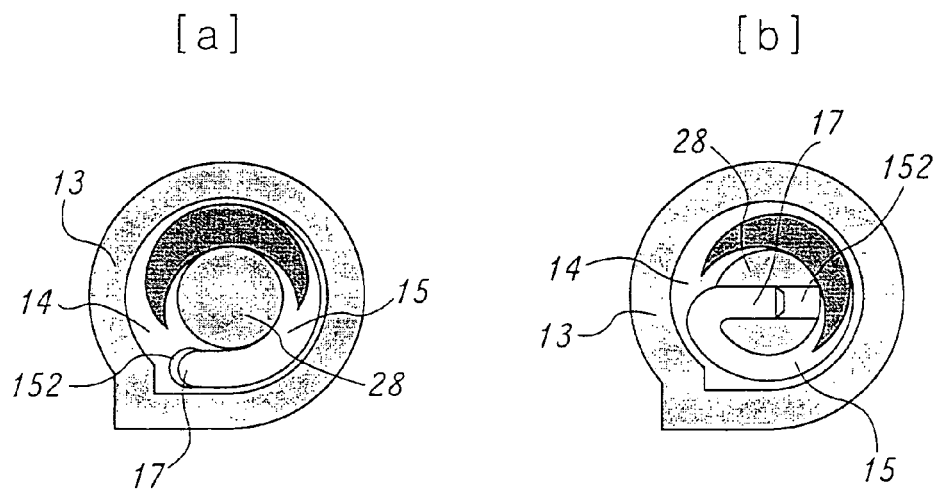
FIG. 9(a) is a cross-sectional view of engagement means, taken about line H—H of FIG. 7.
FIG. 9(b) is a cross-sectional view showing another embodiment of engagement means, taken about line H—H of FIG. 7.

FIG. 9(a) shows that a recess or a hole for the spring arm 17 is formed on the inner wall 14 of the housing 13, while FIG. 9(b) shows that a recess or a slot for the spring arm 17 is formed at the protuberance 28 which is formed on the inner wall 14 in an integrated state.

Figure 10:
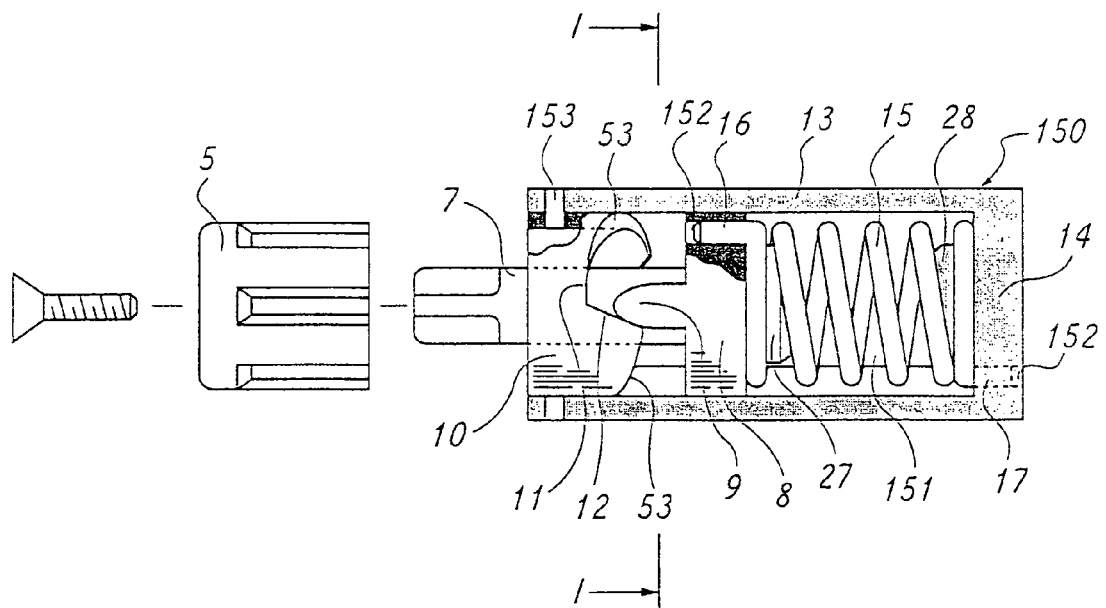
FIG. 10 is a cross-sectional view showing other embodiments of a clutch and an actuator according to the present invention.
Figure 11:
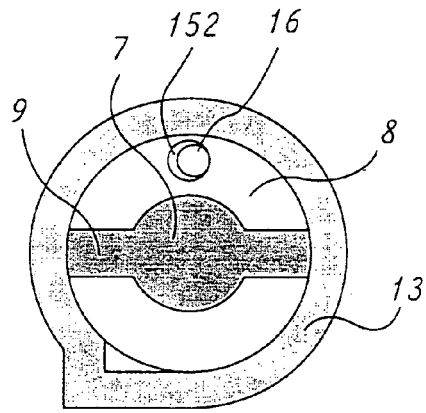
FIG. 11 is a cross-sectional view taken about line I—I of FIG. 10.
Figure 12:
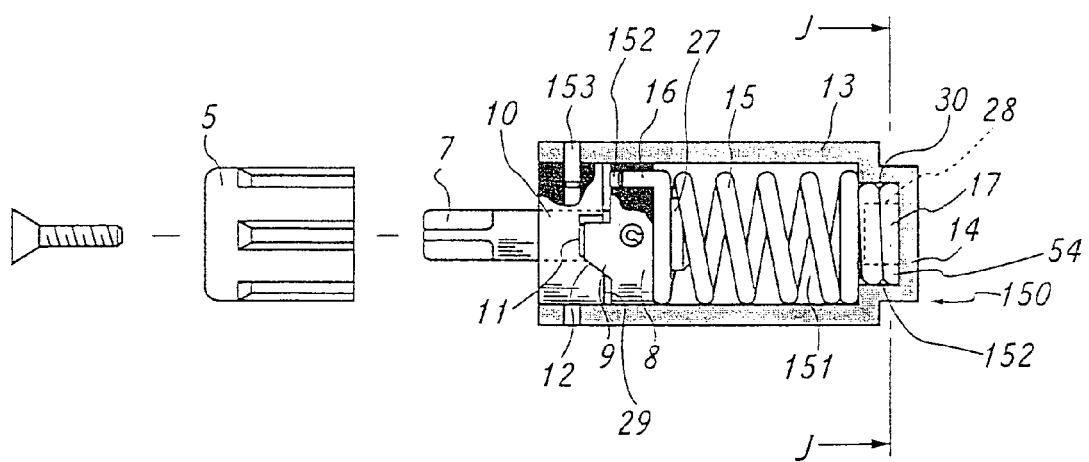
FIG. 12 is a cross-sectional view showing the second embodiment of a housing according to the present invention.
Figure 13:
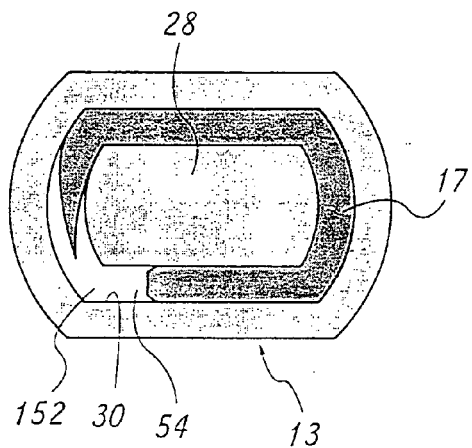
FIG. 13 is a cross-sectional view taken about line J—J of FIG. 12.

FIGS. 10 and 11 show other embodiments of the clutch 10 and the actuator 8 according to the present invention.

The clutch 10 has an opening/closing inclination surface 12, a joining recess 11 which a joining protuberance 9 comes in and out from, and a torsion surface 53, and the actuator 8 has a joining protuberance 9 which is engaged with the opening/closing inclination surface 12 of the clutch 10 when the cover 2 remains closed.

The opening/closing inclination surface 12, designed to be engaged with the joining protuberance 9 when the cover 2 remains closed, has an angle of inclination so as to have a force of restitution by the compression of the torsion-compression spring 15 greater than a force of restitution by the torsion of the torsion-compression spring 15, so that the cover 2 is maintained closed.

The torsion surface 53 of the clutch 10 is formed in such a manner that, when the cover 2 is rotated toward the closed position, the torsion surface 53 acts with the joining protuberance 9 to increase both of the torsion force and the axial compression force of the torsion-compression spring 15 at the same time.

The torsion surface 53 differs from the torsion surface 29 in that, when the cover 2 is rotated from the closed position to the open position, both the rotational force converted from the force of restitution by axial compression, retained in the closed position, by the joining protuberance 9 and the torsion surface 53 which act with together, and the force of restitution by the torsion in the rotational direction retained in the closed position enable the cover 2 to be opened.

When the cover 2 is rotated toward the closed position, the compression force of the torsion-compression spring 15 will usually increase. Therefore, the torsion-compression spring 15, which is inserted when the clutch 10 is fixed to the front side of the housing 13 by means of a fixing means 153, may be set so as to have a low compression force.

The present invention may selectively employ the actuator 8 and the clutch 10 having the torsion surface 29 or the actuator 8 and the clutch 10 having the torsion surface 53.

FIGS. 12 to 23 show other embodiments of the housing 13, which is an element of the present invention. With respect to FIGS. 12 and 13, an engagement means 152 is formed in a space 54 between the protuberance 28 and a side surface 30 formed by reducing the inner wall 14 of the housing 13, so as to prevent the spring arm 17 from rotating.

With respect to FIG. 14, FIG. 15 and FIGS. 16(a)–16(b), the clutch 10 is not fixed to the front side of the housing 13 by means of the fixing means 153.

The clutch 10, formed in the same shape as the housing 13 which is shaped so as for the clutch 10 not to rotate within the housing 13, is inserted into the housing 13, and a separate cap 18 is fixed to an open surface 155 of the housing 13, which is opposed to the clutch 10, by means of the fixing means 153.

The spring arms 16, 17 formed at both ends of the torsion-compression spring 15 to substantially open the cover 2 together with the housing 13, are bent in various shapes. The spring arm 16 may be engaged with the engagement means 152 formed in the actuator 8 or the protuberance 27 and corresponding to the spring arm 16, while the spring arm 17 may be engaged with the engagement means 152 formed on the inner wall 14 of the cap 18 joined to the housing 13 or at the protuberance 28 formed with the inner wall 14 of the cap 18 in an integrated state, and corresponding to the spring arm 17.

Figure 16:
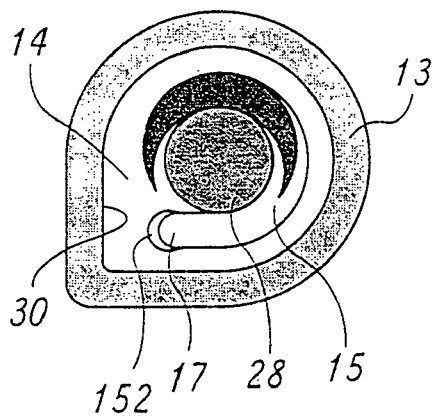
FIG. 16(a) is a cross-sectional view of engagement means, taken about line L—L of FIG. 14.
FIG. 16(b) is a cross-sectional view showing another embodiment of engagement means, taken about line L—L of FIG. 14.
Figure 16:
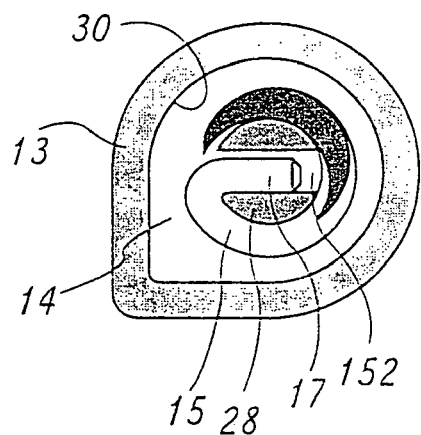
Figure 17:
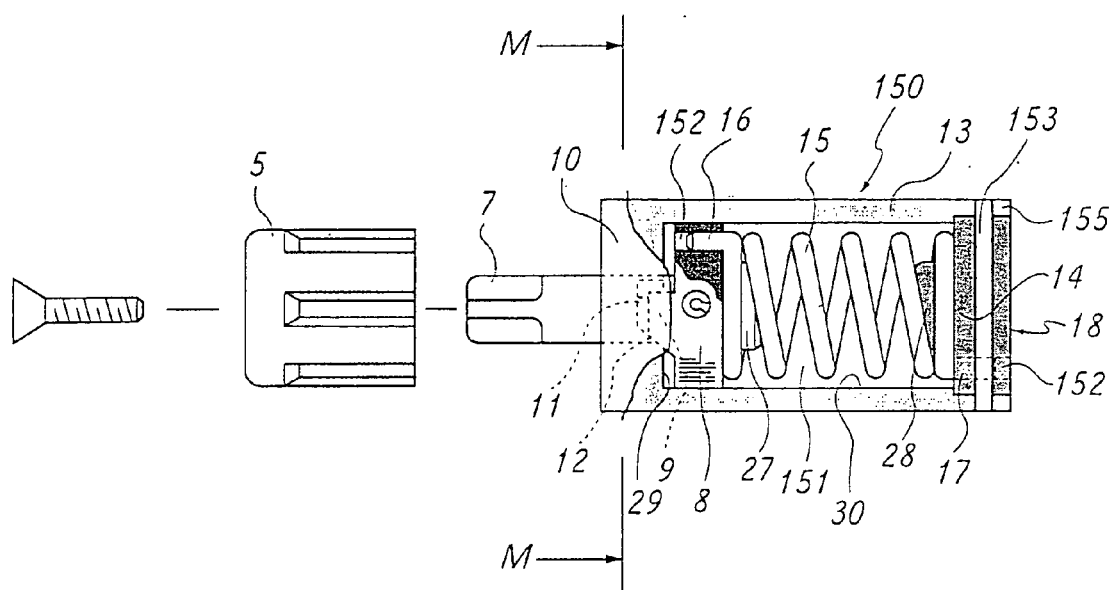
FIG. 17 is a cross-sectional view showing the fourth embodiment of a housing according to the present invention.
Figure 18:
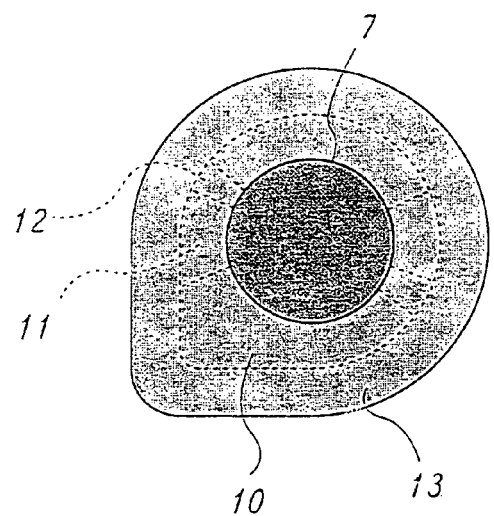
FIG. 18 is a cross-sectional view taken about line M—M of FIG. 17.
Figure 19:
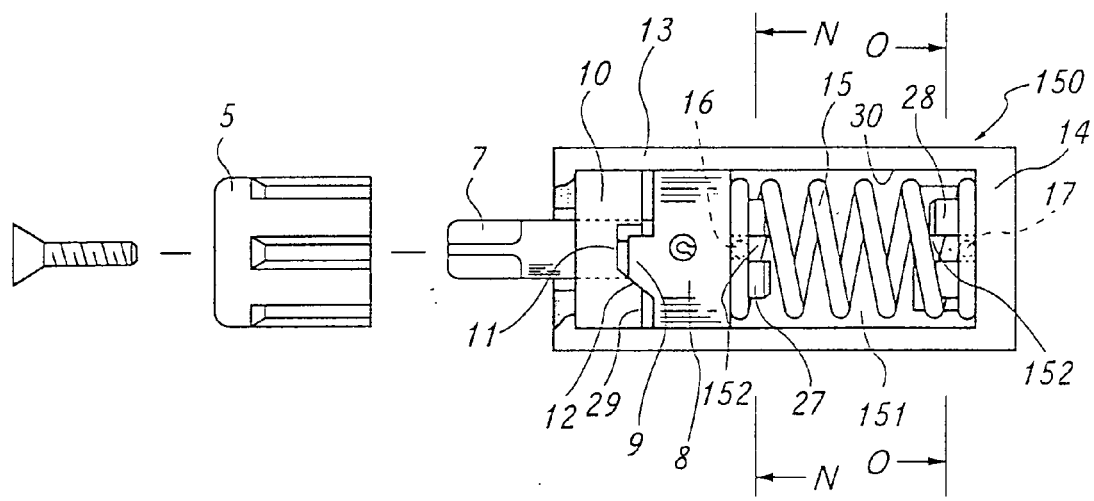
FIG. 19 is a cross-sectional view showing the embodiment of a housing according to the present invention.
Figure 20:
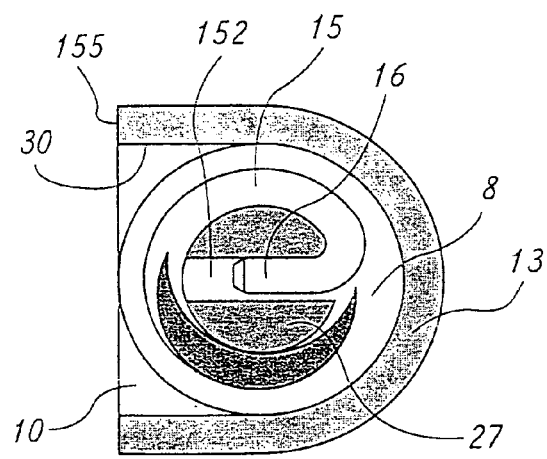
FIG. 20 is a cross-sectional view taken about line N—N of FIG. 19.
Figure 21:
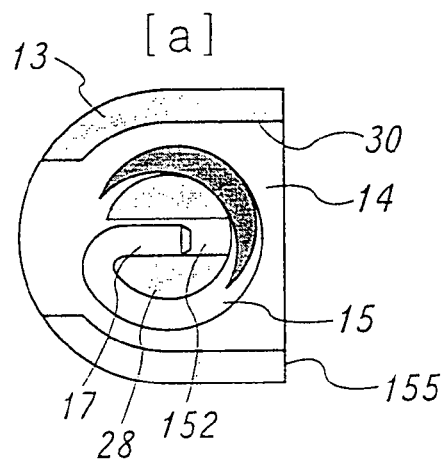
FIG. 21(a) is a cross-sectional view of engagement means, taken about line O—O of FIG. 19, and FIGS. 21(b) and 21(c) are cross-sectional views showing other embodiments of engagement means, taken about line O—O of FIG. 19.
Figure 21:
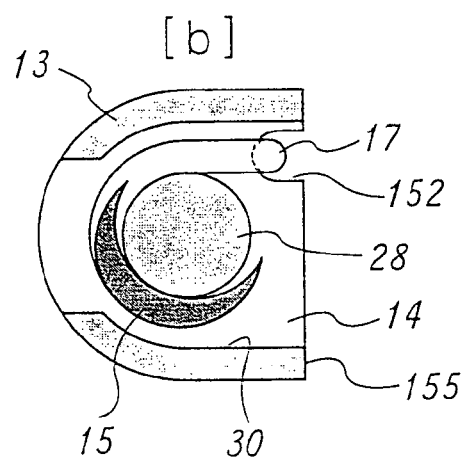
Figure 21:
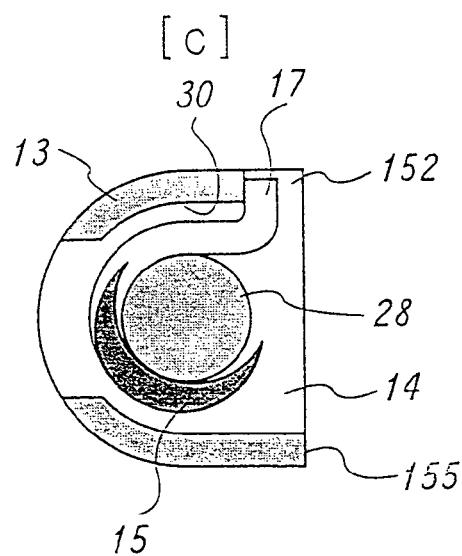

With respect to FIGS. 17 and 18, the clutch 10 is formed in the housing 13 in an integrated state so as for the clutch 10 not to rotate within the housing 13 as shown in FIG. 14, FIG. 15 and FIGS. 16(a)–16(b). The actuator 8 and the torsion-compression spring 15 are assembled after being inserted through the open surface 155, and the cap 18 is fixed thereon by means of the fixing means 153.

With reference to FIG. 19, FIG. 20 and FIGS. 21(a)-(c) the open surface 155 is formed in the housing 13 in a direction perpendicular to the connection shaft 7, and the housing 13 and the clutch 10 are joined with each other in a shape capable of preventing the clutch 10 from rotating. Then, the assembly is finished by the inner wall 14 of the housing 13 without separate fixing means. Especially, FIG. 21(c) shows that the engagement means 152 is formed at the side surface 30 of the housing 13.

Figure 22:
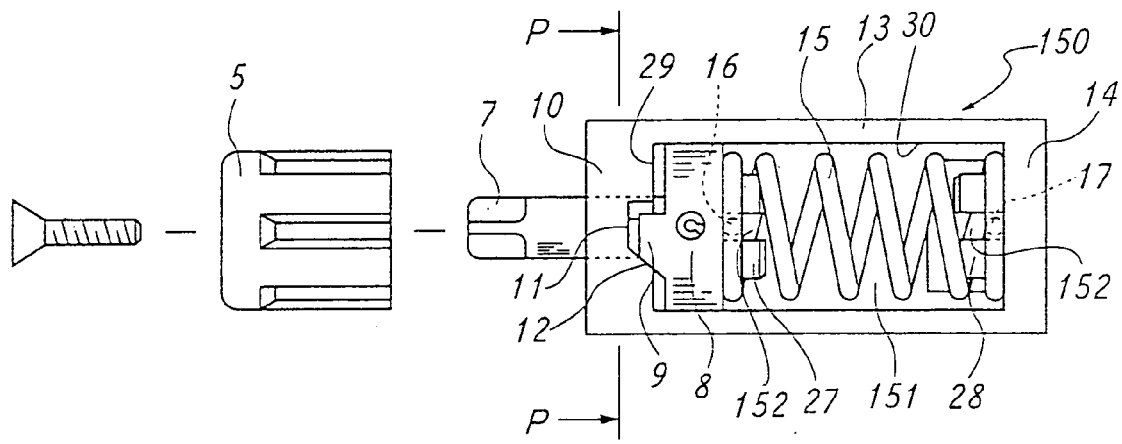
FIG. 22 is a cross-sectional view showing the sixth embodiment of a housing according to the present invention.
Figure 23:
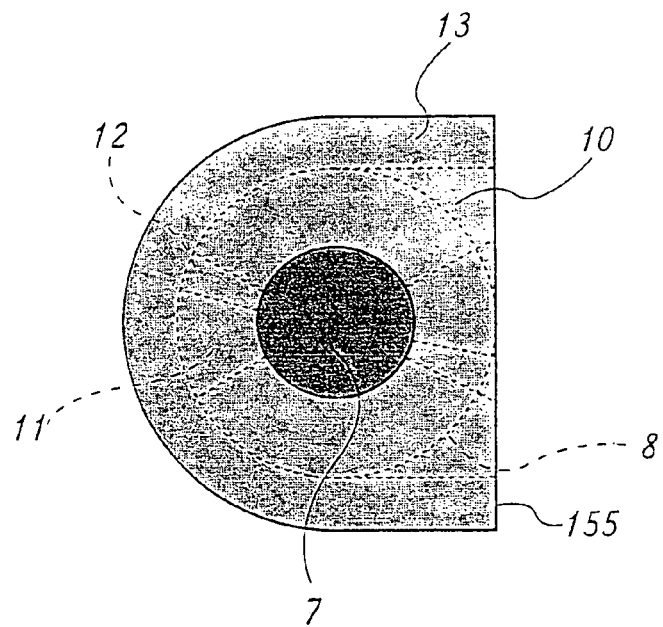
FIG. 23 is a cross-sectional view taken about line P—P of FIG. 22.
Figure 24:
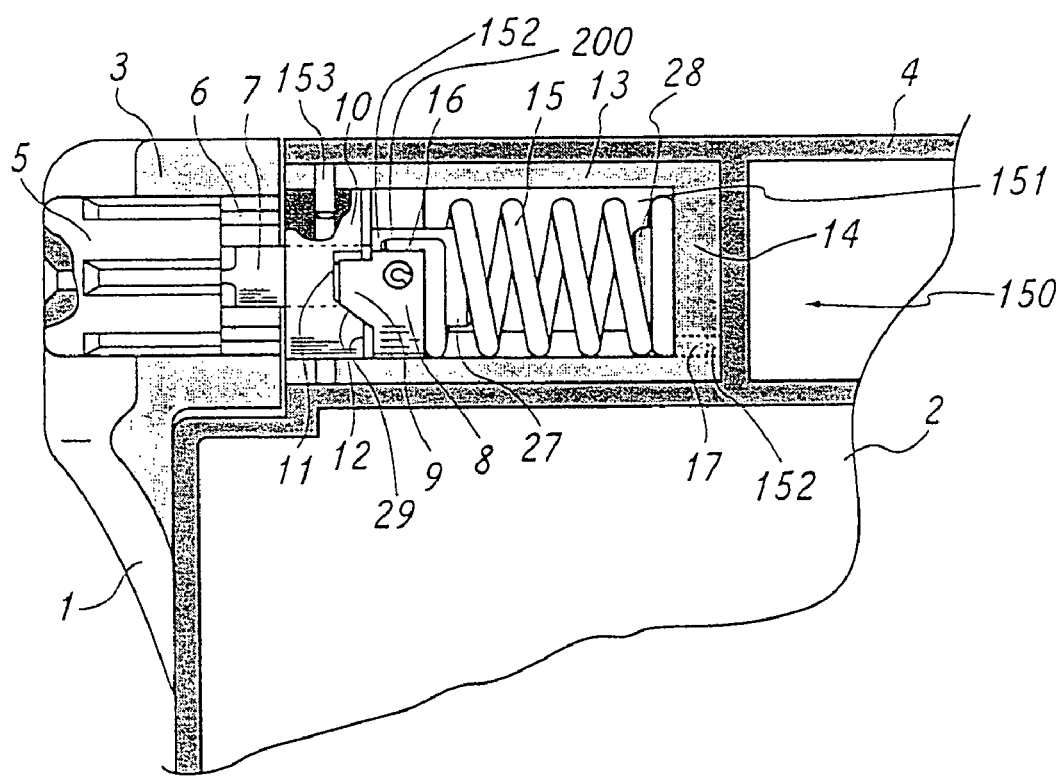
FIG. 24 is a cross-section view showing the second embodiment of the present invention.
Figure 25:
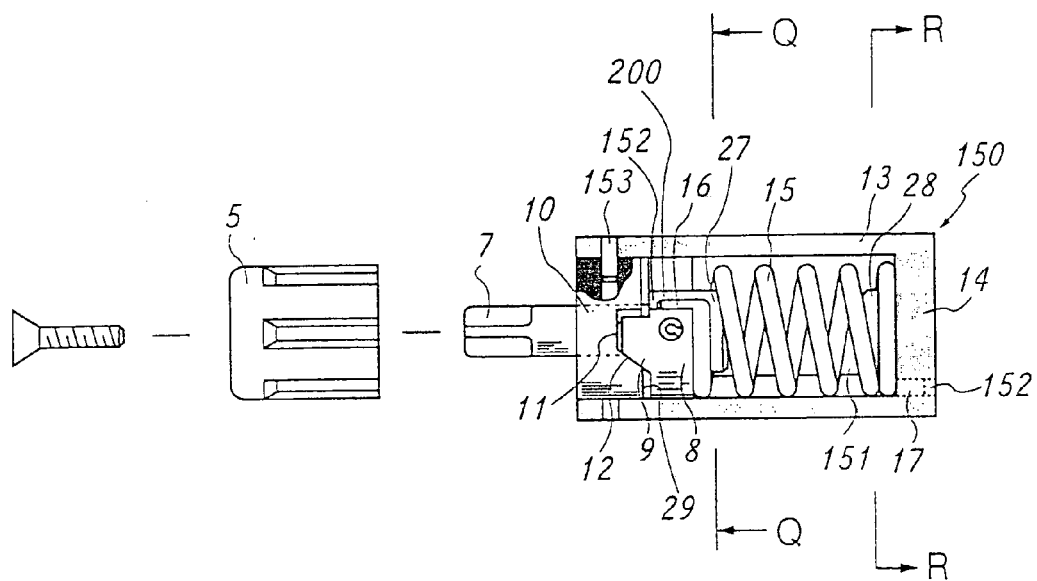
FIG. 25 is a cross-sectional view of a housing which is employed with the second embodiment of the present invention.
Figure 26:
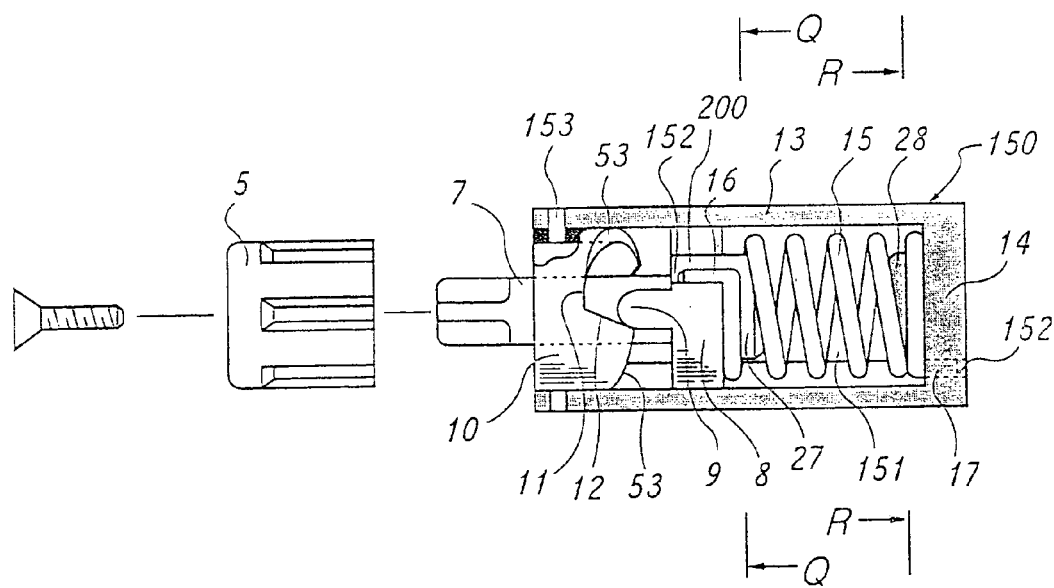
FIG. 26 is a cross-sectional view showing other embodiments of a clutch and a actuator which are employed with the second embodiment of the present invention as shown in FIG. 25.
Figure 27:
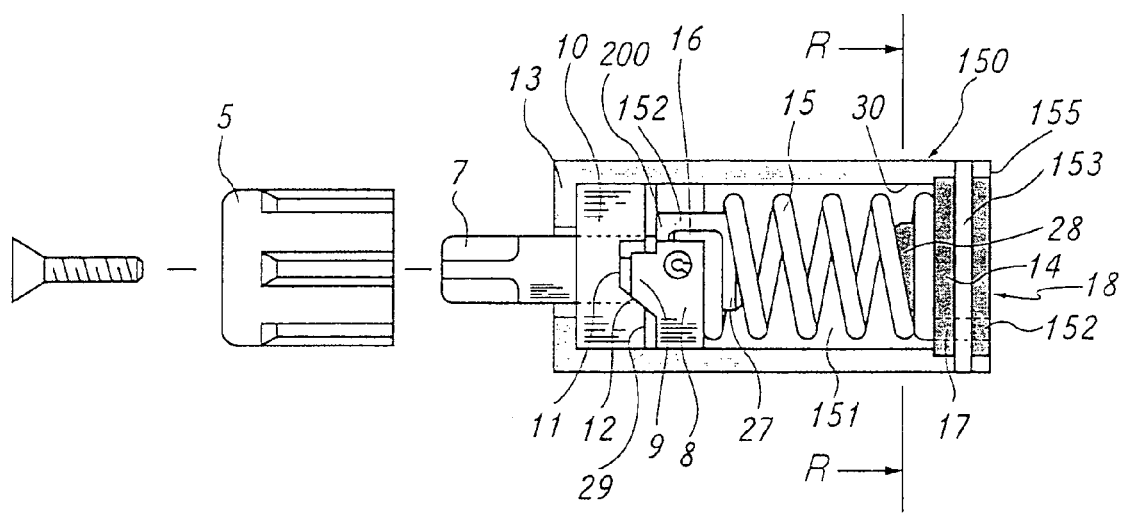
FIG. 27 is a cross-sectional view showing another embodiment of a housing which is employed with the second embodiment of the present invention as shown in FIG. 25.

With reference FIGS. 22 and 23, the open surface 155 is formed in the housing 13 in a direction perpendicular to the connection shaft 7 as shown in FIG. 19, FIG. 20 and FIGS. 21(a)-(c), and the clutch 10 is formed in the housing 13 in an integrated state.

Figure 14:
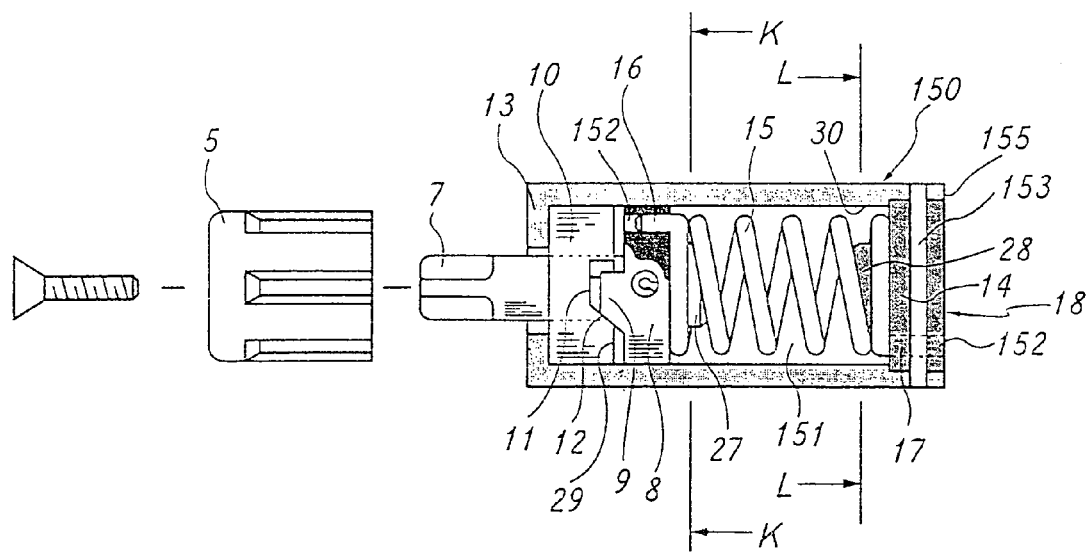
FIG. 14 is a cross-sectional view showing the third embodiment of a housing according to the present invention.
Figure 15:
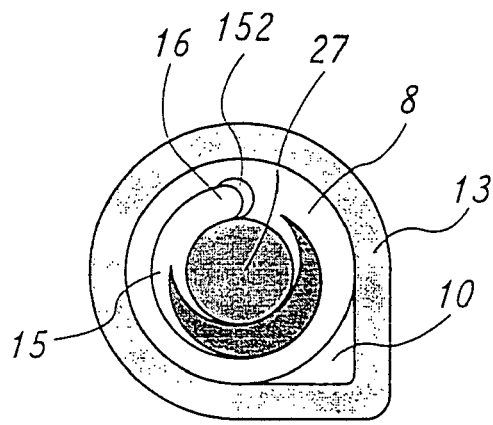
FIG. 15 is a cross-sectional view taken about line K—K of FIG. 14.

With respect to FIGS. 14 and 15, FIGS. 16(*a*) and 16(*b*), FIGS. 17–20, FIGS. 21(*a*)–21(*c*), and FIGS. 22 and 23, holes are formed on the front wall of the housing 13 and in the center of the clutch 10, through which the connection shaft 7 is inserted.

Figure 28:
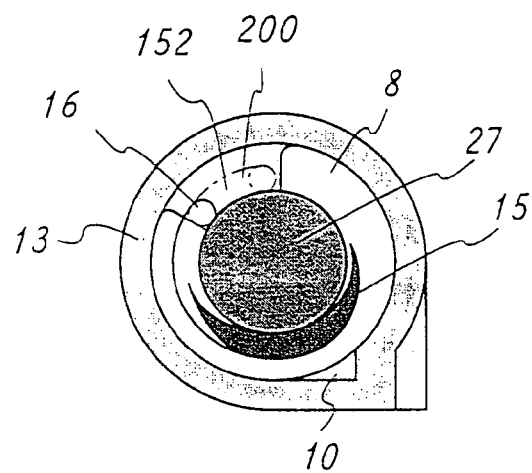
FIG. 28(a) is a cross-sectional view of a recess for idle turning, taken about line Q—Q of FIGS. 25 and 26, and FIGS. 28(b) and 28(c) are cross-sectional views showing other embodiments of a recess for idle turning, taken about line Q—Q of FIGS. 25 and 26.
Figure 28:
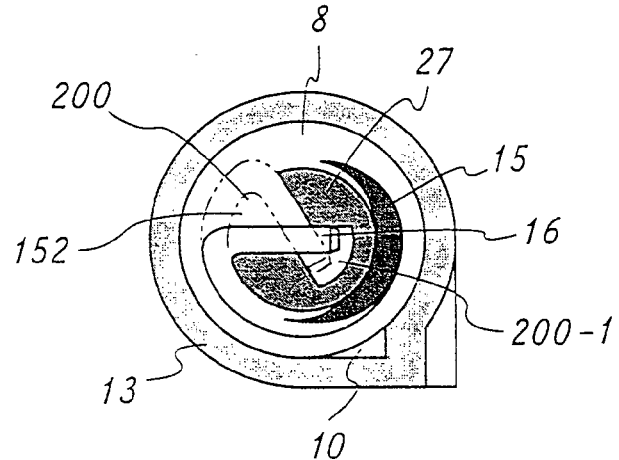
Figure 28:
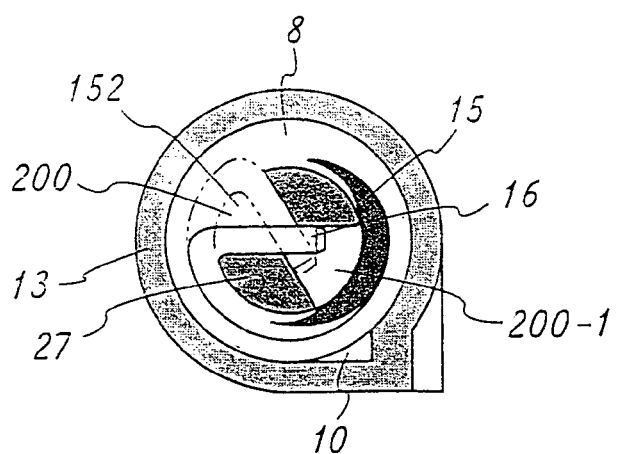
Figure 29:
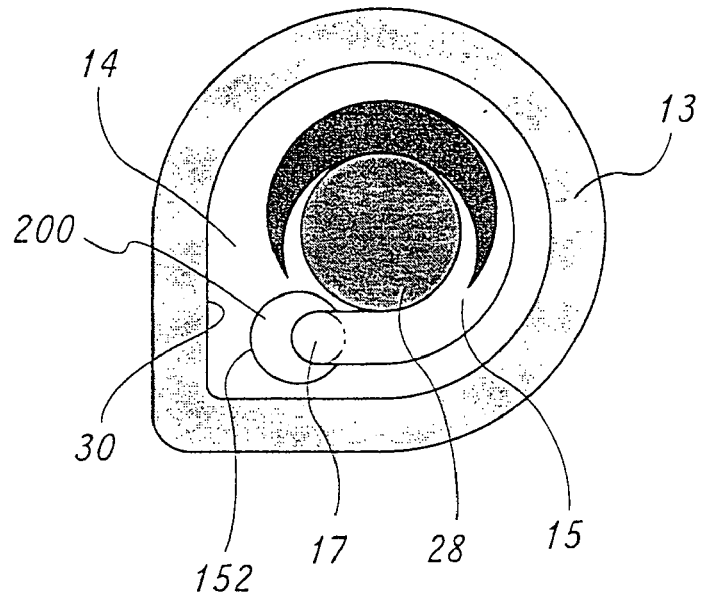
FIG. 29(a) is a cross-sectional view of a recess for idle turning, taken about line R—R of FIGS. 25, 26 and 27.
FIG. 29(b) is a cross-sectional view showing another embodiment of a recess for idle turning, taken about line R—R of FIGS. 25, 26 and 27.
Figure 29:
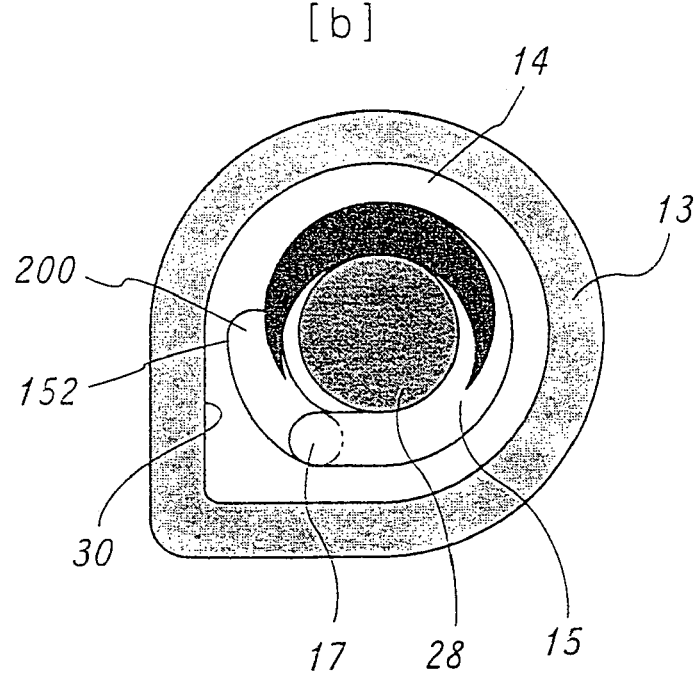

FIGS. 24–27, FIGS. 28(*a*)–28(*c*), and FIGS. 29(*a*) and 29(*b*) relate to the second embodiment of the present invention.

The second embodiment of the present invention is so structured that, when the cover 2 is rotated from the open position to the closed position, the spring arms 16, 17 are idly rotated by a predetermined angle and let the torsion-compression spring 15 have a torsion torque to make the force of restitution by the compression of the torsion-compression spring 15 become larger than the force of restitution by the torsion of the torsion-compression spring 15, thereby strengthening the closed state of the cover 2 in the closed position of the cover 2 so that the cover 2 is prevented from being easily opened by an external impact.

The second embodiment of the present invention is also so structured that especially the accumulation of stress that may result from frequent operations of the torsion-compression spring 15 is prevented in order to guarantee smooth operation and permanent life span of the torsion-compression spring 15.

The structure of the second embodiment of the present invention is described in detail as follows. Further, the second embodiment of the present invention has recesses 200 for idle turning in the engagement means 152 such as a groove, a hole, a slot, and the like, which are formed in the actuator 8 or at the protuberance 27 of the actuator 8, and on the inner wall 14 of the housing 13, at the protuberance 28 of the inner wall 14, on the inner wall 14 of the cap 18, or at the protuberance 28 of the cap 18, so as to fix the spring arms 16, 17 of the torsion-compression spring 15.

In the case that the spring arm 16 of the torsion-compression spring 15 is bent in the axial direction of the actuator 8, the recess 200 for idle turning is so formed that the recess 200 for idle turning has such a depth as that the spring arm 16 is engaged with a circumferential surface of the actuator 8 and has a width by which the spring arm 16 has to be idly rotated in the circumferential direction.

In another embodiment of the recess 200 for idle turning, the spring arm 16 of the torsion-compression spring 15 is bent directly at the winding end of the torsion-compression spring 15, and is engaged with the engagement means 152 formed at the protuberance 27 of the actuator 8. In this case, the recess 200 for idle turning having a degree of angle, by which the spring arm 16 has to idly turn in the circumferential direction, is formed further in the engagement means 152 of the protuberance 27, so that the spring arm 16 of the torsion-compression spring 15 idly turns by a predetermined angle and then provides torsion torque for the torsion-compression spring 15. Of course, an auxiliary recess 200-1 for idle turning is necessarily formed on the opposite side of the recess 200 for idle turning formed in the engagement means 152, so as to ensure a sufficient space in which the end of the spring arm 16 is operated.

The auxiliary recess 200-1 for idle turning may have either an open rear side or a closed rear side, as shown in FIGS. 28(*b*) and 28(*c*), since it does not cause a hinderance to the operation.

FIGS. 29(*a*) and 29(*b*) show that the recess 200 for idle turning is formed in the engagement means 152 which is formed on the inner wall 14 of the housing 13 or on the inner wall 14 of the cap 18, so that the spring arm 17 is engaged with the portion opposed to the actuator 8.

In this case, the engagement means 152 such as a hole or a recess may be formed to have a larger diameter than the spring arm 17, or may be formed to have an elongated hole having a shape of an arc in order to provide a recess 200 for idle turning so 1 that the spring arm 17 can idly turn by a predetermined turning angle. Of course, the recess 200 for idle turning may be employed in any modified constructions of the actuator 8, the clutch 10, and the engagement means 152 which are elements of the housing 13, the cap 18, and the operation assembly 150 of the present invention.

Figure 30:
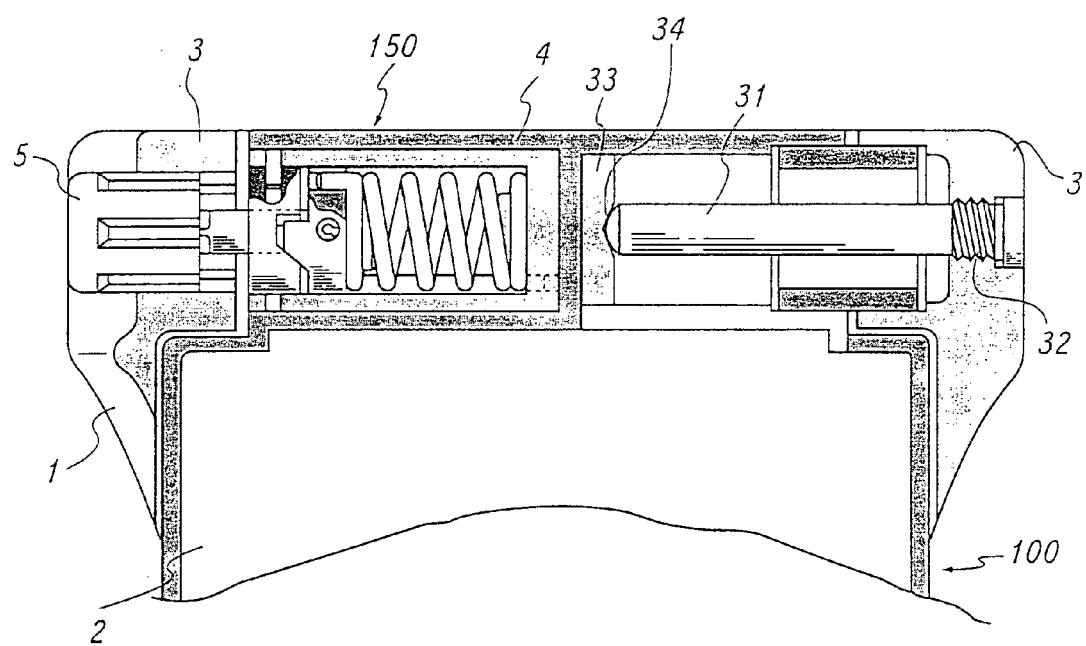
FIG. 30 is a cross-sectional view of the third embodiment of the present invention with friction-reducing means employed.

FIG. 30 shows the third embodiment of the present invention with a friction-reducing means employed to prevent reduction of the torsion torque that may be caused due to a friction between side surfaces of the pivoting section 4 and the shaft connection section 3 opposed to the button 5 when the cover 2 is opened by pressing the button 5.

The friction-reducing means is described concretely as follows. A screw hole is formed at a portion of the shaft connection section 3 opposed to the button 5, and a plate 33 having a groove 34 is inserted within the pivoting section 4. A pin 31 having an adjust screw 32 is inserted through the screw hole of the shaft connection section 3 in such a manner that the pin 31 comes into contact with the groove 34 of the plate 33, so that the gap between the side surfaces of the pivoting section 4 and the shaft connection section 3 can be adjusted by means of the adjust screw 32.

Figure 31:
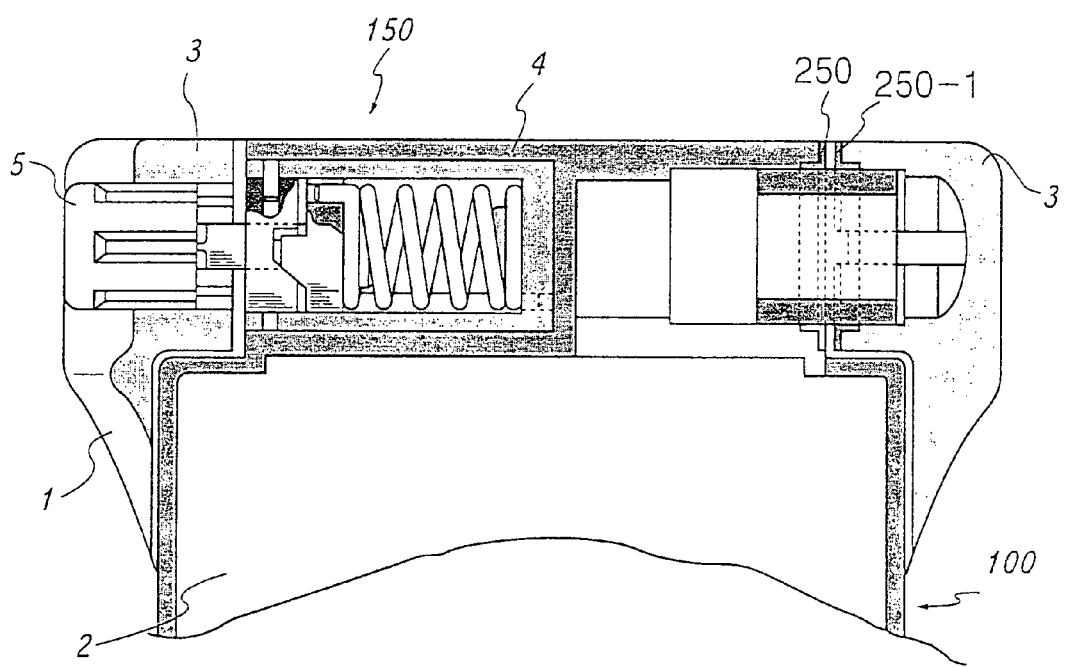
FIG. 31 is a cross-sectional view showing another embodiment of friction-reducing means which is employed with the third embodiment of the present invention.
Figure 32:
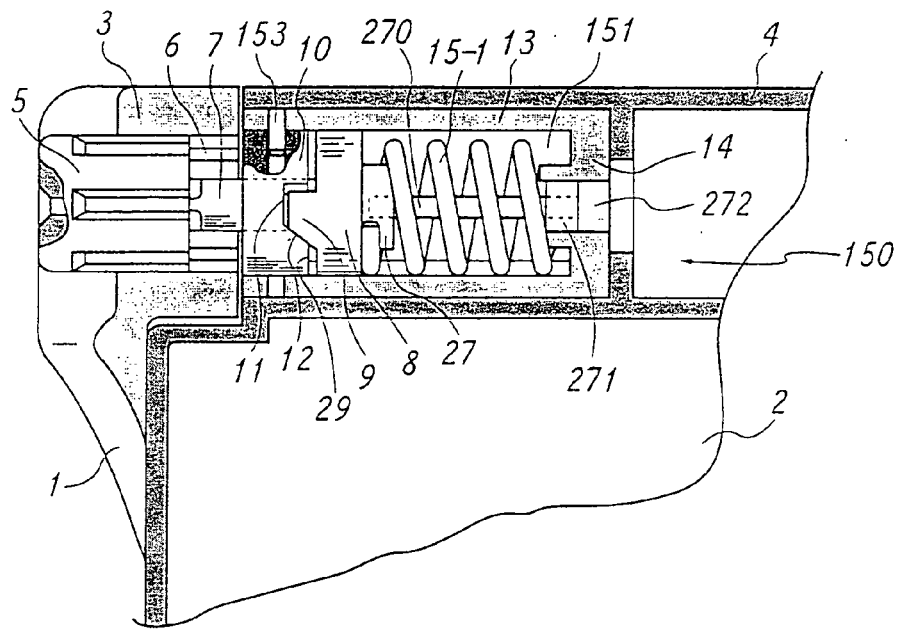
FIG. 32 is a cross-sectional view of the fourth embodiment of the present invention.
Figure 33:
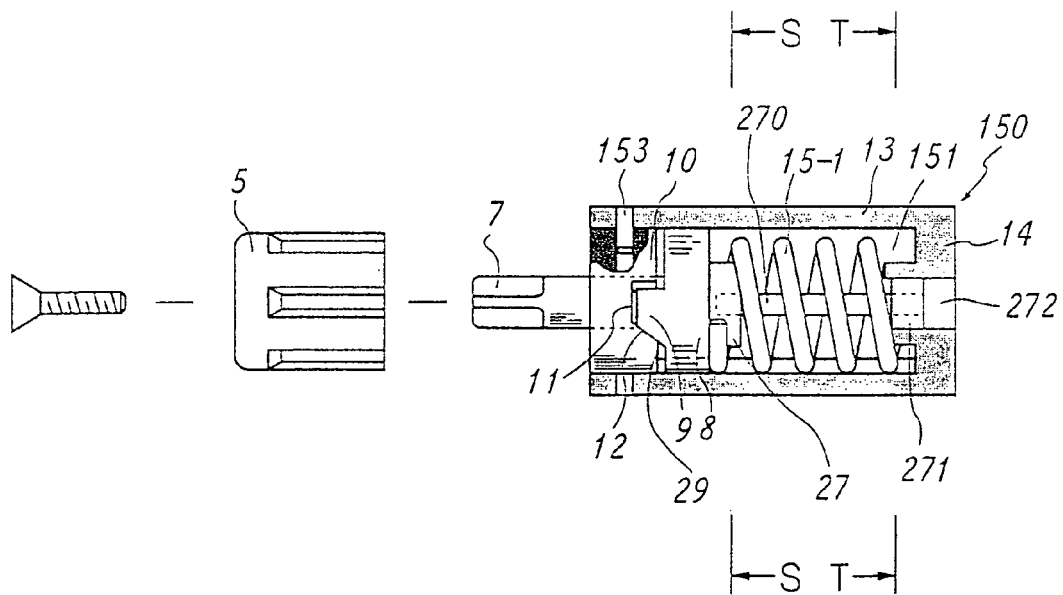
FIG. 33 is a cross-sectional view of a housing which is employed with the fourth embodiment of the present invention as shown in FIG. 32.
Figure 34:
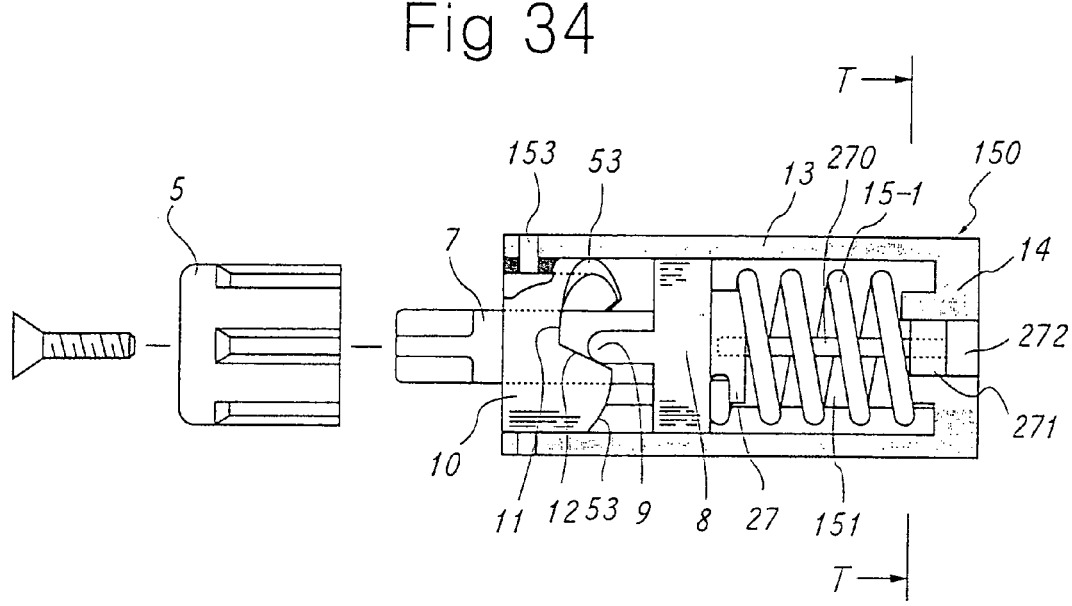
FIG. 34 is a cross-sectional view showing other embodiments of a clutch and a actuator which are employed with the fourth embodiment of the present invention as shown in FIG. 33.
Figure 35:
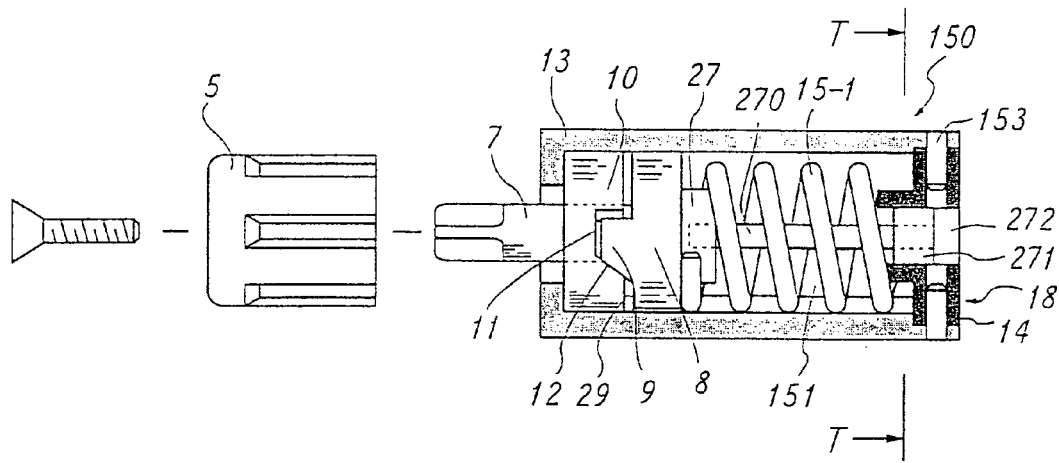
FIG. 35 is a cross-sectional view showing another embodiment of a housing which is employed with the fourth embodiment of the present invention as shown in FIG. 33.
Figure 36:
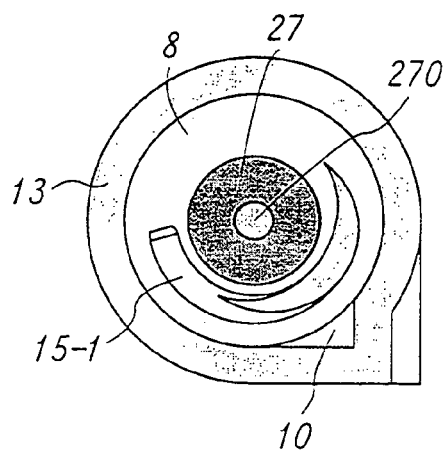
FIG. 36 is a cross-sectional view taken about line S—S of FIG. 33.
Figure 37:
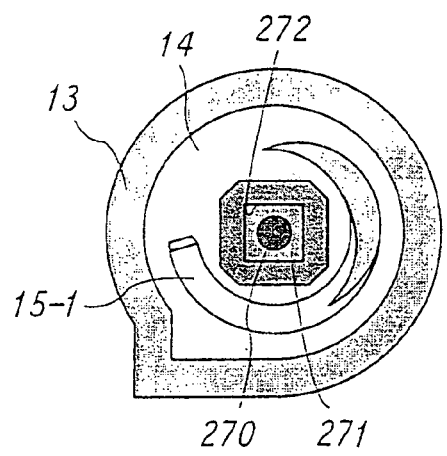
FIG. 37 is a cross-sectional view taken about line T—T of FIGS. 33, 34 and 35.

FIG. 31 shows another embodiment of a friction-reducing means that may be employed with the third embodiment of the present invention, where washers 250, 250-1, having a smooth surface and being made of an abrasion-resistant material, are interposed between side surfaces of the pivoting section 4 and the shaft connection section 3 opposed to the button 5. Alternatively, the washers 250, 250-1 may be inserted when the phone body 1 having the shaft connection section 3 or the cover 2 having the pivoting section 4 is injection-molded.

FIGS. 32 to 38 relate to the fourth embodiment of the present invention, which is provided with a compression spring 15-1 and a torsion bar 270 made of a shape memory alloy having elasticity.

The compression spring 15-1 is disposed between the actuator 8 mounted within the housing 13 and the inner wall 14 of the housing 13 or the inner wall 14 of the cap 18 fixed to the housing 13. When the cover 2 is rotated from the open position to the closed position, therefore, in the prevent invention which employs the clutch 10 having the torsion surface 29 the compression spring 15-1 retains a predetermined compression force in the axial direction by means of the fixing means 153, while in the present invention which employs the clutch 10 having the torsion surface 53 the compression spring 15-1 retains an increased compression force in the axial direction by means of the torsion surface 53.

The torsion bar 270 extends through the center of the compression spring 15-1. One end portion of the torsion bar 270 is fixed to the protuberance 27 formed in the actuator 8 and the other end portion of the torsion bar 270 is fixed to the inner wall 14 of the housing 13 or to the piston 271 inserted into the cylinder 272 formed on the inner wall 14 of the cap 18. The torsion bar 270 is designed to provide an increasing torsion force when the cover 2 is rotated from the open position to the closed position, and to have the maximum force at the closed position.

The piston 271 may be in one of various shapes, such as an oval shape, a rectangular shape, a pentagonal shape and circular shapes with both sides flat, in order not to allow the rotation of the piston 271 within the cylinder 272 but to allow the linear, reciprocating motion of the piston 271, when the button 5 is operated and the cover 2 is rotated. To the contrary, one end portion of the torsion bar 270 may be fixed to the piston 271 inserted in the cylinder formed at the protuberance 27 of the actuator 8, and the other end portion of the torsion bar 270 may be fixed to the inner wall 14 of the housing 13 or to the inner wall 14 of the cap 18 fixed to the housing 13.

Figure 38:
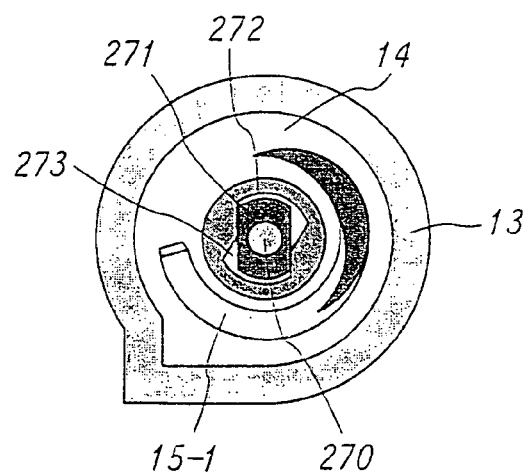
FIG. 38 is a cross-sectional view of another embodiment taken about line T—T of FIGS. 33, 34 and 35.

FIG. 38 shows an embodiment where the cylinder 272, into which the piston 271 fixing one end portion of the torsion bar 270 is inserted, idly turns by a predetermined angle and then the torsion bar 270 comes to have a torsion torque, when the cover 2 is rotated from the open position to the closed position. This means that a recess 273 for idle turning is further provided as in the second embodiment of the present invention, so that a maximum torsion torque can be obtained when the cover 2 reaches the closed position.

Hereinafter, the operation of the prevent invention which is constructed as stated above will be described.

In an initial state with the cover 2 folded on the phone body 1, the torsion-compression spring 15 of the operation assembly 150 contained in the housing 13 inserted in the pivoting section 4 of the cover 2 has the maximum torsion torque, since both of the spring arms 16, 17 are engaged with the engagement means 152 formed in the actuator 8 and either the housing 13 or the cap 18 attached to the housing 13 and therefore the torsion-compression spring 15 remains twisted in the rotational direction of the pivoting section 4.

In this case, although a force of rotating the housing 13 and the cover 2 is generated by the torsion torque of the torsion-compression spring 15, the present closed state is maintained since the torsion-compression spring 15 has been already compressed, the joining protuberance 9 of the actuator 8 is engaged with the opening/closing inclination surface 12 of the clutch 10 having an angle of inclination ensuring the force of restitution by the compression to be larger than the force of restitution by the torsion, and the connection shaft 7 joined with the actuator 8 is in a state of being joined with the button 5 which is inserted in the button hole 6 of the shaft connection section 3 in such a manner that the button 5 cannot rotate.

In this state, the joining protuberance 9 of the actuator 8 and the opening/closing inclination surface 12 of the clutch 10 come into close contact with each other by the torsion-compression spring 15, and the cover 2 is maintained in the closed state, since the force restitution by the compression, applied to the closed position, is larger than the force of restitution by the torsion, applied to the open position.

That is, although the compression force is larger than the torsion force, the cover 2 remains closed on the phone body 1 since there is still as a force that maintains the cover 2 closed as a difference between the two forces.

To open the cover 2 of the mobile phone 100 in this state, by pressing the button 5 the actuator 8, which has been joined with the clutch 10, is spaced from the clutch 10 while compressing the torsion-compression spring 15, and simultaneously a rotational force that the torsion-compression spring 15 has to return to an original state is generated so as to rotate the housing 13 and the cover 2 joined with the housing 13, thereby opening the cover 2.

The operating principles briefly stated above are described in detail. The button 5 is inserted in the button hole 6 formed at the shaft connection section 3 in such a manner that the button 5 cannot rotate therein, but can linearly reciprocate in the axial direction of the connection shaft 7.

Therefore, the button 5, the connection shaft 7, and the actuator 8 assembled with the connection shaft 7 do not rotate but perform only the linear reciprocating motion. By pressing the button 5, the force is transferred through the connection shaft 7 to the actuator 8, and then the actuator 8 pushes the torsion-compression spring 15 toward the interior of the housing 13.

During this process, the joining protuberance 9 and the opening/closing inclination surface 12 are spaced from each other, so as to release the restricted state, so that the torsion-compression spring 15 is changed from a twisted state to a state that the torsion-compression spring 15 can be freely restored to its original position, thereby opening the cover 2. Especially the restoration of the torsion force of the torsion-compression spring 15 begins from the moment when the actuator 8 is sequentially separated from the clutch 10 by pressing the button 5.

The cover 2 can be more easily opened by the force, since the opening/closing inclination surface 12 is formed at the joining recess 11 of the clutch 10, enabling more smooth operation.

The above force of opening the cover 2 by pressing the button 5 should be just larger than the difference between the force of restitution by the torsion and the force of the restitution by the compression, both retained when the cover 2 remains closed.

Further, the intensity of the force of opening the cover 2 by pressing the button 5 is adjusted by both the force of restitution by the torsion and the force of the restitution by the compression which the torsion-compression spring 15 has simultaneously.

Therefore, the intensity of the force can be determined by elements such as the material, wire diameter, outside diameter, winding number, free height, and compression degree of the torsion-compression spring 15, the inclination angle of the opening/closing inclination surface 12, and the unfolded angle, weight and the center of the gravity of the cover 2, so that not only the range of complementary choices can be widened but also the most proper force can be selected.

When a user wants to close the cover 2, e.g., after ending a communication in a state that the cover 2 is open, the user can rotate the cover 2 toward the phone body 1 with hand. At this time, the torsion-compression spring 15 being in a state of minimum torsion torque is twisted again to have the maximum torsion torque.

As stated above, when the cover 2 remains closed, the joining protuberance 9 and the opening/closing inclination surface 12 are engaged with each other to be locked together by the torsion-compression spring 15 already having a torsion torque and a compression force, so that the cover 2 is maintained closed.

In the case of the second embodiment of the present invention, when the cover 2 is rotated from the open position to the closed position, the spring arms 16, 17 of the torsion-compression spring 15 inserted in the recess 200 for idle turning idly turn by a predetermined angle, and then provide the torsion torque for the torsion-compression spring 15, so that the force of restitution by the compression is larger than the force of restitution by the torsion in the closed position of the cover 2 in which the torsion-compression spring 15 has the maximum torsion torque.

This is because, when the cover 2 is rotated from the open position to the closed position, the torsion-compression spring 15 does not immediately generate the torsion torque because of the recess 200 for idle turning in which the spring arms 16, 17 are inserted, but generates the torsion torque after idly turning by an open degree of the recess 200 for idle turning.

While the torsion-compression spring 15 is idly turning, a predetermined magnitude of the compression force is already retained by the fixing means 153 in the case of the torsion surface 29 of the clutch 10, or the compression force increases when the cover 2 is rotated from the open position to the closed position in the case of the torsion surface 53 of the clutch 10.

By this reason, the relatively larger force of restitution by the compression than the force of restitution by the torsion is applied to the joining protuberance 9 and the opening/closing inclination surface 12, so as to strengthen the closed state between the phone body 1 and the cover 2.

Since the force of restitution by the compression of the torsion-compression spring 15 is relatively larger than the force of restitution by the torsion as stated above when the cover 2 is rotated to the closed position, the closing force between the phone body 1 and the cover 2 in a state that the cover 2 is closed is increased, so as to prevent the cover 2 from easily being opened by the external impact. Especially, the recess 200 for idle turning performs a further function of preventing stress from being accumulated on the torsion-compression spring 15, ensuring the smooth operation and the permanent life span of the torsion-compression spring 15.

Further, the increased closing force (the force of restitution by the compression) of the cover 2 may require greater force for operating the button 5. This shortcoming can be overcome by reducing the inclination angle of the opening/closing inclination surface 12 within a range capable of achieving the closed state of the cover 2.

For the third embodiment of the present invention, when the cover 2 is opened by pressing the button 5, the friction-reducing means prevents decrease in the torsion torque that may be caused due to a friction by contact between side surfaces of the pivoting section 4 and the shaft connection section 3 opposed to the pivoting section 4 into which the housing 13 having the operation assembly 150 is inserted.

The friction can be minimized by properly adjusting the gap between the surfaces of the shaft connection section 3 and the pivoting section 4, thereby further improving the opening performance of the cover 2.

That is, since the pin 31 being in contact with the plate 33 inserted in the pivoting section 4 opposed to the housing 13 is joined to the shaft connection section 3 opposed to the housing 13 by means of a screw, the gap between the side surfaces of the shaft connection section 3 and the pivoting section 4 can be adjusted by turning the pin 31 clockwise or counterclockwise.

Particularly, since the pin 31 joined to the shaft connection section 3 opposed to the housing 13 is nearly in point contact with the plate 33 inserted in the pivoting section 4, the friction can be further decreased.

In the case of another embodiment of the friction-reducing means, the washers 250, 250-1 disposed on both side surfaces of the shaft connection section 3 and the pivoting section 4 opposed to the button 5 function to decrease the friction when the cover 2 is opened by pressing the button 5, so as to ensure a smooth opening of the cover 2.

The fourth embodiment of the present invention is described hereinafter. In an initial stage with the cover 2 folded on the phone body 1, one end portion of the torsion bar 270, a portion of the operation assembly 150 disposed in the housing 13 inserted in the pivoting section 4 of the cover 2, is fixed to the protuberance 27 of the actuator 8 and the other end portion of the torsion bar 270 is fixed to the inner wall 14 of the housing 13 or to the piston 271 inserted into the cylinder 272 formed on the inner wall 14 of the cap 18 fixed to the housing 13, while the torsion bar 270 is being in the twisted state in the rotational direction of the pivoting section 4, so that the torsion bar 270 has the maximum torsion torque.

The force of restitution by the torsion of the torsion bar 270 generates a force of forcing the housing 13 and the cover 2 to be opened, but the compression spring 15-1 disposed between the actuator 8 and the inner wall 14 of the housing 13 or the inner wall 14 of the cap 18 fixed to the housing 13 has been already compressed.

Therefore, in this state, the opening/closing inclination surface 12 of the clutch 10 having such an angle of inclination as to make the force of restitution by the compression larger than the force of restitution by the torsion has been engaged with the joining protuberance 9 of the actuator 8, and the connection shaft 7 joined with the actuator 8 has been joined with the button 5 inserted in the button hole 6 of the shaft connection section 3 in such a manner that the button 5 cannot rotate therein, so that the existing state can be maintained.

In this state, since the force of restitution by the compression applied to the closed position of the cover 2 by means of the compression spring 15-1, while the joining protuberance 9 of the actuator 8 and the opening/closing inclination surface 12 of the clutch 10 come into close contact with each other, is larger than the force of restitution by the torsion of the torsion bar 270 applied to the open position, the cover 2 can be maintained in the closed state.

That is, even when the compression force is larger than the torsion force, the cover 2 is maintained closed because the cover 2 is folded on the phone body 1. At this time, the cover 2 also remains closed because a force of the cover 2 being closed, equivalent to the difference between the two forces, still exists.

By pressing the button 5 to open the cover 2 of the mobile phone 100 in this state, the actuator 8 joined with the clutch 10 is spaced from the clutch 10 while compressing the compression spring 15-1, and simultaneously the torsion bar 270 rotates the housing 13 and the cover 2 assembled with the housing 13 while generating a rotational force for forcing the torsion bar 270 to be restored to its original state, thereby opening the cover 2.

The operating principles are described in detail hereunder. The button 5 is inserted in the button hole 6 formed at the shaft connection section 3 in such a manner that the button 5 cannot rotate therein, but can linearly reciprocate in the axial direction of the connection shaft 7.

Therefore, the button 5, the actuator 8 assembled with the connection shaft 7, and the piston 271 fixed to the torsion bar 270 do not rotate in the cylinder 272 but perform only the linear reciprocating motion.

By pressing the button 5, the force is transferred through the connection shaft 7 to the actuator 8, and then the actuator 8 pushes the compression spring 15-1 toward the interior of the housing 13.

During this process, the joining protuberance 9 and the opening/closing inclination surface 12 are spaced from each other, so as to release the restricted state, so that the torsion bar 270 is changed from a twisted state to a state that the torsion bar 270 can be freely restored to its original position, thereby opening the cover 2.

Especially the restoration of the torsion force of the torsion bar 270 begins from the moment when the actuator 8 is sequentially separated from the clutch 10 by pressing the button 5. The cover 2 can be more easily opened by the force, since the opening/closing inclination surface 12 is formed at the joining recess 11 of the clutch 10, enabling more smooth operation.

When a user wants to close the cover 2, e.g., after ending a communication in a state that the cover 2 is open, the user can rotate the cover 2 toward the phone body 1 with hand. At this time, the torsion bar 270 being in a state of minimum torsion torque is twisted again to have the maximum torsion torque.

As stated above, when the cover 2 is closed, the torsion bar 270 already has a torsion torque, and the joining protuberance 9 and the opening/closing inclination surface 12 are engaged with each other to be locked together by the compression spring 15-1 already remaining compressed, so that the cover 2 is maintained closed.

When the cover 2 is rotated from the open position to the closed position, the torsion bar 270 is fixed to the protuberance 27 of the actuator 8 and to the inner wall 14 of the housing 13 or to the piston 271 inserted in the cylinder 272 formed on the inner wall 14 of the cap 18 fixed to the housing 13.

In the case of the cylinder 272 provided with a further recess 273 for idle turning, the torsion bar 270 idly turns by a predetermined angle, and then comes to have a torsion torque.

Therefore, the force of restitution by the compression of the compression spring 15-1 becomes larger than the force of restitution by the torsion of the torsion bar 270 in the closed position of the cover 2 in which the maximum torsion torque is provided.

This is because, when the cover 2 is rotated from the open position to the closed position, the torsion bar 270 does not immediately generate the torsion torque because of the recess 273 for idle turning formed in the cylinder 272, but generates the torsion torque after the cylinder 272 idly turns by an open degree of the recess 273 for idle turning.

While the cylinder 272 is idly turning, a predetermined magnitude of the compression force of the compression spring 15-1 is already retained by the fixing means 153 in the case of the torsion surface 29 of the clutch 10, or the compression force increases when the cover 2 is rotated from the open position to the closed position in the case of the torsion surface 53 of the clutch 10.

By this reason, the relatively larger force of restitution by the compression than the force of restitution by the torsion is applied to the joining protuberance 9 and the opening/closing inclination surface 12, so as to strengthen the closed state between the phone body 1 and the cover 2.

It is natural that the torsion bar 270 linearly reciprocates in the axial direction when the cover 2 is opened and closed, since one end portion of the torsion bar 270 is fixed to the actuator 8 and the other end portion of the torsion bar 270 is fixed to the inner wall 14 of the housing 13 or to the piston 271 inserted into the cylinder 272 formed on the inner wall 14 of the cap 18.

The present embodiment is provided with the torsion bar 270 and the compression spring 15-1 that generate the torsion force and the compression force, respectively, necessary for opening and closing the cover 2 as described above, so that the cover 2 has an improved opening and closing performance.

Further, in the mobile phone 100 with which the present invention is employed, even when the cover 2 is opened directly with hand without pressing the button 5, the actuator 8 can be smoothly separated from the clutch 10 by means of the opening/closing inclination surface 12, so as to open the cover 2, as described above.

The present invention may apply to both folder and flip types of the mobile phone 100. Preferably, the present invention can apply to the folder type of the mobile phone.

INDUSTRIAL APPLICABILITY

In the apparatus and the method for opening a cover of a mobile phone according to the present invention as described above, a button for opening a cover is provided at a predetermined portion of a phone body, at which a user can easily operate the button, so that the cover can be easily opened when the mobile phone is used.

Especially, the present invention may apply to any types of mobile phone, including a folder type and a flip type, thereby providing wider applicability and improving convenience in use.

What is claimed is:

1. An apparatus for opening a cover of a mobile phone 100 comprising a phone body 1 containing a circuit board and having operation buttons, and a cover 2 hingedly assembled with said phone body 1 by means of a shaft connection section 3 and a pivoting section 4 of said cover 2, so that said cover 2 can be pivotally opened and closed, comprising a housing 13 containing operation assembly 150 is disposed within said pivoting section 4 of said cover 2 of said mobile phone 100, and button 5 is disposed in said shaft connection section 3 of said phone body 1 so as to control said operation assembly 150, wherein said operation assembly 150 comprises a torsion-compression spring 15 inserted in a receiving chamber 151 of said housing 13 and having spring arms 16, 17 formed at both ends so as to generate an axial force and a torsion force in a rotational direction, an actuator 8 having a connection shaft 7 in front of said torsion-compression spring 15, and a clutch 10 joined with said actuator 8 in front of said actuator 8, said clutch 10 fixed to the front side of said housing 13 by means of fixing means 153 so as to be able to retain a torsional force in the rotational direction and a compressed force in the axial direction and including an opening/closing inclination surface 12, a joining recess 11 which a joining protuberance 9 comes in and out from, and torsion surfaces 29; 53, said actuator 8 having a joining protuberance 9 which is engaged with said opening/closing inclination surface 12 of said clutch 10 when said cover 2 is closed, and said opening/closing inclination surface 12 being engaged with said joining protuberance 9 when the cover 2 remains closed and having an angle of inclination so as to have a force of restitution by the compression of said torsion-compression spring 15 greater than a force of restitution by the torsion of said torsion-compression spring 15, so that said cover 2 is maintained closed; protuberances 27, 28 are formed in a protruded state in said actuator 8 and on the inner wall 14 of said housing 13 so as to maintain said torsion-compression spring 15 in a stable state and maximize torsional efficiency when said cover 2 is rotated, and have engagement means 152 to secure said spring arms 16, 17 formed on both ends of said torsion-compression spring 15; and said button 5 is inserted into a button hole 6 formed in said shaft connection section 3 in such a manner that said button 5 cannot rotate in said button hole 6 and is joined with said connection shaft 7 extending through the center of said clutch 10.

2. An apparatus for opening a cover of a mobile phone according to claim 1 wherein said torsion-compression spring 15 having said spring arms 16, 17 has an axial force and a torsion torque which is to increase as said cover 2 is folded in a rotational direction by said engagement means 152.

3. An apparatus for opening a cover of a mobile phone according to claim 1 wherein said torsion surface 29 of said clutch 10 is formed in such a manner that, when said cover 2 is rotated toward the closed position, said torsion surface 29 acts with said joining protuberance 9 to increase only the torsion force of said torsion-compression spring 15, so that when said cover 2 is rotated from the closed position to the open position, the force of restitution by the torsion in the rotational direction retained in the closed position enables said cover 2 to be opened.

4. An apparatus for opening a cover of a mobile phone according to claim 1 wherein said torsion surface 53 of the clutch 10 is formed in such a manner that, when said cover 2 is rotated toward the closed position, the torsion surface 53 acts with the joining protuberance 9 to increase both of the torsion force and the axial compression force of said torsion-compression spring 15 at the same time, so that when said cover 2 is rotated from the closed position to the open position, both the rotational force converted from the force of restitution by axial compression, retained in the closed position, by said joining protuberance 9 and said torsion surface 53 which act with together, and the force of restitution by the torsion in the rotational direction retained in the closed position enable said cover 2 to be opened.

5. An apparatus for opening a cover of a mobile phone according to claim 1 wherein said clutch 10, formed in the same shape as said housing 13 which is shaped so as for said clutch 10 not to rotate within said housing 13, is inserted into said housing 13, a hole through which said connection shaft 7 is inserted is formed on the front wall of said housing 13, and an inner wall 14 and a protuberance 28 which include engagement means 152 corresponding to spring arm 17 are formed in a position opposed to said clutch 10.

6. An apparatus for opening a cover of a mobile phone according to claim 1 wherein said clutch 10 and said housing 13 are formed with each other in an integrated state so as for said clutch 10 not to rotate within said housing 13, a hole through which said connection shaft 7 is inserted is formed in said clutch 10 and on the front wall of said housing 13, and an inner wall 14 and a protuberance 28 which include engagement means 152 corresponding to a spring arm 17 are formed in a position opposed to said clutch 10.

7. An apparatus for opening a cover of a mobile phone according to claim 1 wherein said clutch 10 and said housing 13 are formed with each other in an integrated state so as for said clutch 10 not to rotate within said housing 13, a hole through which said connection shaft 7 is inserted is formed in said clutch 10 and on the front wall of said housing 13, a separate cap 18 having a protuberance 28 is fixed to an open surface 155 of said housing 13 by means of fixing means 153, and an inner wall 14 and a protuberance 28 of said cap 18 include engagement means 152 corresponding to a spring arm 17.

8. An apparatus for opening a cover of a mobile phone according to claim 1 wherein said clutch 10, formed in the same shape as said housing 13 which is shaped so as for said clutch 10 not to rotate within said housing 13, is inserted into said housing 13, a hole through which said connection shaft 7 is inserted is formed on the front wall of said housing 13, a separate cap 18 having a protuberance 28 is fixed to an open surface 155 of said housing 13 by means of fixing means 153, and an inner wall 14 and a protuberance 28 of said cap 18 include engagement means 152 corresponding to a spring arm 17.

9. An apparatus for opening a cover of a mobile phone according to claim 1 wherein friction-reducing means is provided so as to reduce the force of friction between side surfaces of pivoting section 4 and shaft connection section 3 opposed to said button 5 when cover 2 is opened by pressing said button 5.

10. An apparatus for opening a cover of a mobile phone according to claim 9 wherein said friction-reducing means is so constructed that a screw hole is formed at a portion of said shaft connection section 3 opposed to said button 5, a plate 33 having a groove 34 is inserted within said pivoting section 4 opposed to said button 5, and a pin 31 having an adjust screw 32 is inserted through said screw hole of said shaft connection section 3 in such a manner that said pin 31 comes into contact with said groove 34 of said plate 33, so that the gap between the side surfaces of said pivoting section 4 and said shaft connection section 3 can be adjusted by means of said adjust screw 32 of said pin 31.

11. An apparatus for opening a cover of a mobile phone according to claim 9 wherein washers 250, 250-1 as said friction-reducing means are interposed between side surfaces of said pivoting section 4 and said shaft connection section 3 opposed to said button 5.

12. An apparatus for opening a cover of a mobile phone according to claim 1 wherein said operation assembly 150 is directly installed within said pivoting section 4 of said cover 2 without being contained in said housing 13.

13. An apparatus for opening a cover of a mobile phone phone according to claim 1, wherein there are compression on spring 15-1 generating a compression force in the axial direction and torsion bar 270 made of a shape memory alloy with elasticity and degenerating a torsion force in the rotational direction of said cover 2.

14. An apparatus for opening a cover of a mobile phone according to claim 13 wherein said compression spring 15-1 is disposed between said actuator 8 mounted within said housing 13 and said inner wall 14 of said housing 13, one end portion of said torsion bar 270 is fixed to said protuberance 27 formed in said actuator 8 through the center of said compression spring 15-1, the other end portion of said torsion bar 270 is fixed to a piston 271 inserted into a cylinder 272 formed on said inner wall 14, said piston 271 is so shaped that said piston 271 cannot rotate within said cylinder 272 but can linearly reciprocate in the axial direction when said button 5 is operated and said cover 2 is rotated, and a torsion force of said torsion bar 270 increases when said cover 2 is rotated from the open position to the closed position, and becomes maximum at the closed position.

15. An apparatus for opening a cover of a mobile phone according to claim 14 wherein cap 18 having inner wall 14 is fixed to said housing 13 by means of fixing means 153, and said cylinder 272 into which said piston 271 is inserted is formed on said inner wall 14 of said cap 18.

16. An apparatus for opening a cover of a mobile phone according to claim 14 wherein recess 273 for idle turning is further formed in said cylinder 272, into which said piston 271 is inserted, so that, when said cover 2 is rotated from the open position to the closed position, said torsion bar 270 comes to have a torsion torque after said cylinder 272 idly turns by a predetermined angle, thereby having maximum torsion torque when said cover 2 reaches the closed position.

17. An apparatus for opening a cover of a mobile phone according to claim 1, wherein said engagement means 152 includes a slot, a recess and a hole which is formed in the position corresponding to said spring arms 16, 17.

18. An apparatus for opening a cover of a mobile phone according to claim 17 wherein recess 200 for idle turning is further formed in said engagement means 152, so that, when said cover 2 is rotated from the open position to the closed position, said spring arms 16, 17 are idly rotated by a predetermined angle and let said torsion-compression spring 15 have a torsion torque to make the force of restitution by the compression of said torsion-compression spring 15 become larger than the force of restitution by the torsion of said torsion-compression spring 15, thereby strengthening the closed state of said cover 2 in the closed position of said cover 2 so as not to be easily opened by an external impact, and preventing stress from being accumulated on said torsion-compression spring 15.

19. An apparatus for opening a cover of a mobile phone according to claim 18 wherein said recess 200 for idle turning is so formed that said recess 200 for idle turning has such a depth as that said spring arm 16 is engaged with a circumferential surface of said actuator 8 and has a width by which said spring arm 16 has to be idly rotated in the circumferential direction.

20. An apparatus for opening a cover of a mobile phone according to claim 18 wherein said recess 200 for idle turning having a degree of angle by which said spring arm 16 has to idly turn in the circumferential direction, is further formed in said engagement means 152 of said protuberance 27.

21. An apparatus for opening an cover of a mobile phone according to claim 20 wherein auxiliary recess 200-1 for idle turning is further formed on the opposite side of said recess 200 for idle turning, so as to ensure a sufficient space in which the end of said spring arm 16 is operated.

22. An apparatus for opening a cover of a mobile phone according to claim 18 wherein, with regard to said recess 200 for idle turning, the diameter of said engagement means 152, into which said spring arm 17 of said torsion-compression spring 15 is inserted and which is formed on said inner wall 14, is larger than that of said spring arm 17.

23. An apparatus for opening a cover of a mobile phone according to claim 18 wherein, with regard to said recess 200 for idle turning, said engagement means 152, into which said spring arm 17 of said torsion-compression spring 15 is inserted and which is formed on said inner wall 14, is formed so as to have an elongated hole having a shape of an arc.

* * * * *